US008843882B1

(12) United States Patent
Dejban et al.

(10) Patent No.: US 8,843,882 B1
(45) Date of Patent: Sep. 23, 2014

(54) SYSTEMS, METHODS, AND ALGORITHMS FOR SOFTWARE SOURCE CODE ANALYTICS AND SOFTWARE METADATA ANALYSIS

(71) Applicant: GitViz, LLC, Los Angeles, CA (US)

(72) Inventors: Bardia Dejban, Los Angeles, CA (US); Jamie Snider, Los Angeles, CA (US); Gary Rudolph, Los Angeles, CA (US)

(73) Assignee: Codalytics, Inc., Los Angeles, CA (US)

( * ) Notice: Subject to any disclaimer, the term of this patent is extended or adjusted under 35 U.S.C. 154(b) by 0 days.

(21) Appl. No.: 14/097,550

(22) Filed: Dec. 5, 2013

(51) Int. Cl.
*G06F 7/00* (2006.01)
*G06F 17/00* (2006.01)
*G06F 17/30* (2006.01)
*G06F 9/44* (2006.01)

(52) U.S. Cl.
CPC .................................... *G06F 8/77* (2013.01)
USPC ........... 717/108; 707/638; 707/722; 717/101; 717/102; 717/109; 717/110; 717/114; 717/127

(58) Field of Classification Search
CPC ............... G06F 8/20; G06F 8/65; G06F 9/44; G06F 17/30592; G06F 17/30569; G06F 17/30997; G06F 17/30595; G06F 17/30663; G06F 17/30286
See application file for complete search history.

(56) References Cited

U.S. PATENT DOCUMENTS

| | | | | |
|---|---|---|---|---|
| 8,285,678 | B2* | 10/2012 | Moore et al. | 707/638 |
| 8,438,532 | B2* | 5/2013 | Fox et al. | 717/101 |
| 8,499,280 | B2* | 7/2013 | Davies et al. | 717/110 |
| 2005/0223354 | A1* | 10/2005 | Drissi et al. | 717/114 |
| 2006/0200477 | A1* | 9/2006 | Barrenechea | 707/100 |
| 2006/0282479 | A1* | 12/2006 | Johnson et al. | 707/203 |
| 2007/0011659 | A1* | 1/2007 | Venolia | 717/127 |
| 2009/0070734 | A1* | 3/2009 | Dixon et al. | 717/102 |
| 2012/0180024 | A1* | 7/2012 | Gonzalez et al. | 717/109 |
| 2012/0272205 | A1* | 10/2012 | Fox et al. | 717/101 |
| 2012/0331439 | A1* | 12/2012 | Zimmermann et al. | 717/101 |
| 2013/0080349 | A1* | 3/2013 | Bhola et al. | 705/348 |
| 2013/0218867 | A1* | 8/2013 | DeLuca et al. | 707/722 |
| 2013/0311968 | A1* | 11/2013 | Sharma | 717/101 |

\* cited by examiner

*Primary Examiner* — Don Wong
*Assistant Examiner* — Anibal Rivera
(74) *Attorney, Agent, or Firm* — Robert C. Klinger

(57) ABSTRACT

A system and method capable of summarizing data for all of a software company's engineers, repos (projects) and the entire organization so the executives and managers of the organization can make better decisions. The system is configured to fetch and mine data related to the end-user's organization, projects, people, source code and source code metadata and use proprietary algorithms to calculate various scores such as Velocity, Churn and Skill. The end-user is able to see the various scores, including a Master Score, for various contexts such as the Organization, repos (projects) or individuals (engineers). The score provides a CTO or VP of Engineering, for instance, with a quick health status that would otherwise be unknown or very time-consuming to obtain.

18 Claims, 37 Drawing Sheets

| Org | |
|---|---|
| URL Sample: | https://api.github.com/orgs/lolay |
| | |
| Field | Example |
| login | lolay |
| id | 239275 |
| url | https://api.github.com/orgs/lolay |
| repos_url | https://api.github.com/orgs/lolay/repos |
| events_url | https://api.github.com/orgs/lolay/events |
| members_url | https://api.github.com/orgs/lolay/members{/member} |
| public_members_url | https://api.github.com/orgs/lolay/public_members{/member} |
| avatar_url | https://secure.gravatar.com/avatar/3fe6e8e432c7fbbcaa6bdf1abc9c40e5?d=https://a248.e.akamai.net/assets.github.com%2Fimages%2Fgravatars%2Fgravatar-org-420.png |
| name | Lolay, Inc. |
| company | <null> |
| blog | www.lolay.com |
| location | Moorpark, CA |
| email | <null> |
| public_repos | 39 |
| public_gists | 0 |
| followers | 0 |
| following | 0 |
| html_url | https://github.com/lolay |
| created_at | 2010-04-08T05:10:49Z |
| updated_at | 2013-04-14T21:46:21Z |
| type | Organization |
| total_private_repos | 64 |
| owned_private_repos | 64 |
| private_gists | 0 |
| disk_usage | 5056763 |
| collaborators | 0 |
| billing_email | github@lolay.com |
| plan | { "name": "platinum", "space": 62914560, "private_repos": 125 } |

| Repo | |
|---|---|
| URL Sample: | https://api.github.com/repos/lolay/state-api |

| Field | Example |
|---|---|
| id | 6650233 |
| name | state-api |
| full_name | lolay/state-api |

FIG. 3C-1

| Repo | |
|---|---|
| URL Sample: | https://api.github.com/repos/lolay/state-api |

| Field | Example |
|---|---|
| owner | {<br>　"login": "lolay",<br>　"id": 239275,<br>　"avatar_url": "https://secure.gravatar.com/avatar/<br>　3fe6e8e432c7fbbcaa6bdf1abc9c40e5?d=https://a248.e.akamai.net/<br>　assets.github.com%2images%2Fgravatars%2Fgravatar-org-420.png"<br>　gravatar_id": "3fe6e8e432c7fbbcaa6bdf1abc9c40e5",<br>　"url": "https://api.github.com/users/lolay",<br>　"html_url": "https://github.com/lolay",<br>　"followers_url": "https://api.github.com/users/lolay/followers",<br>　"following_url": "https://api.github.com/users/lolay/following",<br>　"gists_url": "https://api.github.com/users/lolay/gists{/gist_id}",<br>　"starred_url": "https://api.github.com/users/lolay/starred{/owner}{/repo}",<br>　"subscriptions_url": "https://api.github.com/users/lolay/subscriptions",<br>　"organizations_url": "https://api.github.com/users/lolay/orgs",<br>　"repos_url": "https://api.github.com/users/lolay/repos",<br>　"events_url": "https://api.github.com/users/lolay/events{/privacy}",<br>　"received_events_url": "https://api.github.com/users/lolay/received_events",<br>　"type": "Organization"<br>} |
| private | true |
| html_url | https://github.com/lolay/state-api |
| description | |
| fork | false |

TO FIG. 3C-2

FROM FIG. 3C-1

| | |
|---|---|
| url | https://api.github.com/repos/lolay/state-api |
| forks_url | https://api.github.com/repos/lolay/state-api/forks |
| keys_url | https://api.github.com/repos/lolay/state-api/keys{/key_id} |
| collaborators_url | https://api.github.com/repos/lolay/state-api/collaborators{/collaborator} |
| teams_url | https://api.github.com/repos/lolay/state-api/teams |
| hooks_url | https://api.github.com/repos/lolay/state-api/hooks |
| issue_events_url | https://api.github.com/repos/lolay/state-api/issues/events{/number} |
| events_url | https://api.github.com/repos/lolay/state-api/events |
| assignees_url | https://api.github.com/repos/lolay/state-api/assignees{/user} |
| branches_url | https://api.github.com/repos/lolay/state-api/branches{/branch} |
| tags_url | https://api.github.com/repos/lolay/state-api/tags{/tag} |
| blobs_url | https://api.github.com/repos/lolay/state-api/git/blobs{/sha} |
| git_tags_url | https://api.github.com/repos/lolay/state-api/git/tags{/sha} |
| git_refs_url | https://api.github.com/repos/lolay/state-api/git/refs{/sha} |
| trees_url | https://api.github.com/repos/lolay/state-api/git/trees{/sha} |
| statuses_url | https://api.github.com/repos/lolay/state-api/statuses/{sha} |
| languages_url | https://api.github.com/repos/lolay/state-api/languages |
| stargazers_url | https://api.github.com/repos/lolay/state-api/stargazers |
| contributors_url | https://api.github.com/repos/lolay/state-api/contributors |
| subscribers_url | https://api.github.com/repos/lolay/state-api/subscribers |
| subscription_url | https://api.github.com/repos/lolay/state-api/subscription |
| commits_url | https://api.github.com/repos/lolay/state-api/commits{/sha} |
| git_commits_url | https://api.github.com/repos/lolay/state-api/git/commits{/sha} |
| comments_url | https://api.github.com/repos/lolay/state-api/comments{/number} |

| Repo | |
|---|---|
| URL Sample: | https://api.github.com/repos/lolay/state-api |
| | |
| Field | Example |
| issue_comment_url | https://api.github.com/repos/lolay/state-api/issues/comments/{number} |
| contents_url | https://api.github.com/repos/lolay/state-api/contents/{+path} |
| compare_url | https://api.github.com/repos/lolay/state-api/compare/{base}...{head} |
| merges_url | https://api.github.com/repos/lolay/state-api/merges |
| archive_url | https://api.github.com/repos/lolay/state-api/{archive_format}{/ref} |
| downloads_url | https://api.github.com/repos/lolay/state-api/downloads |
| issues_url | https://api.github.com/repos/lolay/state-api/issues{/number} |
| pulls_url | https://api.github.com/repos/lolay/state-api/pulls{/number} |
| milestones_url | https://api.github.com/repos/lolay/state-api/milestones{/number} |
| notifications_url | https://api.github.com/repos/lolay/state-api/notifications{?since,all,participating} |
| labels_url | https://api.github.com/repos/lolay/state-api/labels{/name} |
| created_at | 2012-11-12T08:21:46Z |
| updated_at | 2013-01-13T02:44:46Z |
| pushed_at | 2013-01-08T23:21:13Z |
| git_url | git://github.com/lolay/state-api.git |
| ssh_url | git@github.com:lolay/state-api.git |
| clone_url | https://github.com/lolay/state-api.git |
| svn_url | https://github.com/lolay/state-api |
| homepage | null |
| size | 1056 |
| watchers_count | 0 |
| language | Python |
| has_issues | TRUE |
| has_downloads | TRUE |
| has_wiki | TRUE |
| forks_count | 0 |
| mirror_url | null |
| open_issues_count | 0 |
| forks | 0 |

TO FIG. 3D-2

FROM FIG. 3D-1

| | |
|---|---|
| open_issues | 0 |
| watchers | 0 |
| master_branch | master |
| default_branch | master |
| permissions | {<br>   "admin": true,<br>   "push": true,<br>   "pull": true<br>} |
| network_count | 0 |

FIG. 3D-2

| Repo | |
|---|---|
| URL Sample: | https://api.github.com/repos/lolay/state-api |
| Field | Example |
| organization | {<br>   "login": "lolay",<br>   "id": 239275,<br>   "avatar_url": "https://secure.gravatar.com/avatar/3fe6e8e432c7fbbcaa6bdf1abc9c40e5?d=https://a248.e.akamai.net/assets.github.com%2Fimages%2Fgravatars%2Fgravatar-org-420.png"<br>   gravatar_id": "3fe6e8e432c7fbbcaa6bdf1abc9c40e5",<br>   "url": "https://api.github.com/users/lolay",<br>   "html_url": "https://github.com/lolay",<br>   "followers_url": "https://api.github.com/users/lolay/followers",<br>   "following_url": "https://api.github.com/users/lolay/following",<br>   "gists_url": "https://api.github.com/users/lolay/gists{/gist_id}",<br>   "starred_url": "https://api.github.com/users/lolay/starred{/owner}{/repo}",<br>   "subscriptions_url": "https://api.github.com/users/lolay/subscriptions",<br>   "organizations_url": "https://api.github.com/users/lolay/orgs",<br>   "repos_url": "https://api.github.com/users/lolay/repos",<br>   "events_url": "https://api.github.com/users/lolay/events{/privacy}",<br>   "received_events_url": "https://api.github.com/users/lolay/received_events",<br>   "type": "Organization"<br>} |

FIG. 3E

| User | |
|---|---|
| URL Sample: | https://api.github.com/users/bdejban |
| | |
| Field | Example |
| login | bdejban |
| id | 94802 |
| avatar_url | https://secure.gravatar.com/avatar/b0b0d7a8ee2a83dfa6039a63fdcc1eae?d= https://a248.e.akamai.net/assets.github.com%2Fimages %2Fgravatars%2Fgravatar-org-420.png |
| gravatar_id | b0b0d7a8ee2a83dfa6039a63fdcc1eae |
| url | https://api.github.com/users/bdejban |
| html_url | https://github.com/bdejban |
| followers_url | https://api.github.com/users/bdejban/followers |
| following_url | https://api.github.com/users/bdejban/following |
| gists_url | https://api.github.com/users/bdejban/gists{/gist_id} |
| starred_url | https://api.github.com/users/bdejban/starred{/owner}{/repo} |
| subscriptions_url | https://api.github.com/users/bdejban/subscriptions |
| organizations_url | https://api.github.com/users/bdejban/orgs |
| repos_url | https://api.github.com/users/bdejban/repos |
| events_url | https://api.github.com/users/bdejban/events{/privacy} |
| received_events_url | https://api.github.com/users/bdejban/received_events |
| type | User |
| name | Bardia Dejban |
| company | Lolay, Inc. |
| blog | http://www.lolay.com |
| location | Los Angeles, CA |

FIG. 3F

| User | |
|---|---|
| URL Sample: | https://api.github.com/users/bdejban |
| | |
| Field | Example |
| email | null |
| hireable | false |
| bio | null |
| public_repos | 0 |
| followers | 981 |
| following | 121 |
| created_at | 2009-06-12T19:23:59Z |
| updated_at | 2013-04-11T06:37:00Z |
| public_gists | 0 |
| total_private_repos | 0 |
| owned_private_repos | 0 |
| disk_usage | 0 |
| collaborators | 0 |
| plan | {<br>  "name": "free",<br>  "space": 307200,<br>  "collaborators": 0,<br>  "private_repos": 0<br>} |
| private_gists | 0 |
| site_admin | false |

| Commits | |
|---|---|
| URL Sample: | https://api.github.com/repos/lolay/state-api/git/commits/6ef39427eb8cfc2b734cf7ad6ea0eb1fc5fa3b0a |
| | |
| Field | Example |
| sha | 6ef39427eb8cfc2b734cf7ad6ea0eb1fc5fa3b0a |
| commit:author | {<br>    "name": "GaryRudolph",<br>    "email": "garyrudolph@mac.com",<br>    "date": "2013-01-08T23:15:00Z"<br>} |
| commit:committer | {<br>    "name": "GaryRudolph",<br>    "email": "garyrudolph@mac.com",<br>    "date": "2013-01-08T23:15:00Z"<br>} |
| commit:message | Fixed phone number |
| commit:tree | {<br>    "sha": "9108fc478a9fb1730d27a88a865448b02649953d",<br>    "url": "https://api.github.com/repos/lolay/state-api/git/trees/9108fc478a9fb1730d27a88a865448b02649953d"<br>} |

FIG. 3I-1

| Commits | |
|---|---|
| URL Sample: | https://api.github.com/repos/lolay/state-api/git/commits/6ef39427eb8cfc2b734cf7ad6ea0eb1fc5fa3b0a |
| | |
| Field | Example |
| commit:url | https://api.github.com/repos/lolay/state-api/git/commits/6ef39427eb8cfc2b734cf7ad6ea0eb1fc5fa3b0a |
| commit:comment_c | 0 |
| url | https://api.github.com/repos/lolay/state-api/commits/6ef39427eb8cfc2b734cf7ad6ea0eb1fc5fa3b0a |
| html_url | https://github.com/lolay/state-api/commit/6ef39427eb8cfc2b734cf7ad6ea0eb1fc5fa3b0a |
| comments_url | https://api.github.com/repos/lolay/state-api/commits/6ef39427eb8cfc2b734cf7ad6ea0eb1fc5fa3b0a/comments |

TO FIG. 3I-2

FROM FIG. 3I-1

| author | { "login": "GaryRudolph", "id": 95432, "avatar_url": "https://secure.gravatar.com/avatar/c419651216d145df4ed2a382310e5f52?d=https://a248.e.akamai.net/assets.github.com%2Fimages%2Fgravatars%2Fgravatar-user-420.png" "gravatar_id":"c419651216d145df4ed2a382310e5f52", "url": "https://api.github.com/users/GaryRudolph", "html_url": "https://github.com/GaryRudolph", "followers_url": "https://api.github.com/users/GaryRudolph/followers", "following_url": "https://api.github.com/users/GaryRudolph/following", "gists_url": "https://api.github.com/users/GaryRudolph/gists{/gist_id}", "starred_url": "https://api.github.com/users/GaryRudolph/starred{/owner}{/repo}", "subscriptions_url": "https://api.github.com/users/GaryRudolph/subscriptions", "organizations_url": "https://api.github.com/users/GaryRudolph/orgs", "repos_url": "https://api.github.com/users/GaryRudolph/repos", "events_url": "https://api.github.com/users/GaryRudolph/events{/privacy}", "received_events_url": "https://api.github.com/users/GaryRudolph/received_events", "type": "User" } |
|---|---|
| committer | { "login": "GaryRudolph", "id": 95432, "avatar_url": "https://secure.gravatar.com/avatar/c419651216d145df4ed2a382310e5f52?d=https://a248.e.akamai.net/assets.github.com%2Fimages%2Fgravatars%2Fgravatar-user-420.png" "gravatar_id":"c419651216d145df4ed2a382310e5f52", "url": "https://api.github.com/users/GaryRudolph", "html_url": "https://github.com/GaryRudolph", "followers_url": "https://api.github.com/users/GaryRudolph/followers", "following_url": "https://api.github.com/users/GaryRudolph/following", "gists_url": "https://api.github.com/users/GaryRudolph/gists{/gist_id}", "starred_url": "https://api.github.com/users/GaryRudolph/starred{/owner}{/repo}", "subscriptions_url": "https://api.github.com/users/GaryRudolph/subscriptions", "organizations_url": "https://api.github.com/users/GaryRudolph/orgs", "repos_url": "https://api.github.com/users/GaryRudolph/repos", "events_url": "https://api.github.com/users/GaryRudolph/events{/privacy}", "received_events_url": "https://api.github.com/users/GaryRudolph/received_events", "type": "User" } |

FIG. 3I-2

| | |
|---|---|
| Commits | |
| URL Sample: | https://api.github.com/repos/lolay/state-api/git/commits/6ef39427eb8cfc2b734cf7ad6ea0eb1fc5fa3b0a |
| | |
| Field | Example |
| parents | [<br>  {<br>    "sha": "369b9c3da3e41978b0b63457c6826d17ece31f59",<br>    "url": "https://api.github.com/repos/lolay/state-api/commits/369b9c3da3e41978b0b63457c6826d17ece31f59",<br>    "html_url": "https://github.com/lolay/state-api/commit/369b9c3da3e41978b0b63457c6826d17ece31f59"<br>  }<br>] |
| stats | {<br>  "total": 320,<br>  "additions": 311,<br>  "deletions": 9<br>} |
| files | [<br>  {<br>    "sha": "26d2fc2a84b2a55d2a9a7c7b0879c1f4eec2f329",<br>    "filename": "Application/Settings.bundle/Root.plist",<br>    "status": "modified",<br>    "additions": 20,<br>    "deletions": 0,<br>    "changes": 20,<br>    "blob_url": "https://github.com/lolay/mingle-ios/blob/dfdea22123460acf4bb5217cd59b99efcec607ee/Application/Settings.bundle/Root.plist"<br>    "raw_url": "https://github.com/lolay/mingle-ios/raw/dfdea22123460acf4bb5217cd59b99efcec607ee/Application/Settings.bundle/Root.plist"<br>    "contents_url": "https://api.github.com/repos/lolay/mingle-ios/contents/Application/Settings.bundle/Root.plist?ref=dfdea22123460acf4bb5217cd59b99efcec607ee"<br>    "patch": "@@ -54,6 +54,26 @@\n \t\t\t\t<string>mng-settings-accent-none</string>\n \t\t\t</array><br>  }<br>] |

| Organization Summary Data | | | |
|---|---|---|---|
| Commit Date | Additions | Deletions | Changes |
| 2013-09-19 | 565 | 565 | 1130 |
| 2013-09-18 | 3760 | 964 | 4724 |
| 2013-09-17 | 2036 | 2445 | 4481 |
| 2013-09-16 | 2211 | 1055 | 3266 |
| 2013-09-15 | 2221 | 521 | 2742 |
| 2013-09-14 | 1588 | 515 | 2103 |
| 2013-09-13 | 8940 | 726 | 9666 |
| 2013-09-12 | 3175 | 1847 | 5022 |
| 2013-09-11 | 2161 | 1220 | 3381 |
| 2013-09-10 | 1688 | 451 | 2139 |

| Repository Summary Data | | | |
|---|---|---|---|
| Commit Date | Additions | Deletions | Changes |
| 2013-09-18 | 600 | 272 | 872 |
| 2013-09-17 | 378 | 221 | 599 |
| 2013-09-15 | 135 | 85 | 220 |
| 2013-09-14 | 148 | 114 | 262 |
| 2013-09-12 | 30 | 10 | 40 |
| 2013-09-09 | 285 | 188 | 473 |
| 2013-09-08 | 54 | 7 | 61 |
| 2013-09-06 | 1041 | 464 | 1505 |
| 2013-09-04 | 165 | 9 | 174 |
| 2013-08-29 | 39581 | 1 | 39582 |

| User Summary Data | | | |
|---|---|---|---|
| Commit Date | Additions | Deletions | Changes |
| 2013-08-02 | 18 | 2 | 20 |
| 2013-07-15 | 1 | 1 | 2 |
| 2013-07-10 | 12 | 2 | 14 |
| 2013-07-09 | 7 | 4 | 11 |
| 2013-07-08 | 2445 | 933 | 3378 |
| 2013-07-07 | 251 | 103 | 354 |
| 2013-07-02 | 375 | 94 | 469 |
| 2013-06-28 | 295 | 3 | 298 |
| 2013-06-27 | 269 | 21 | 290 |

| Contributor Summary Data | | | | |
|---|---|---|---|---|
| Commit Date | Contributor Name | Additions | Deletions | Changes |
| 2013-09-13 | Greg Ritter | 30 | 22 | 52 |
| 2013-08-31 | Greg Ritter | 10 | 10 | 20 |
| 2013-08-30 | Brandon Greeley | 1 | 1 | 2 |
| 2013-08-27 | Brandon Greeley | 678 | 635 | 1313 |
| 2013-08-25 | Brandon Greeley | 211 | 20 | 231 |
| 2013-08-24 | Brandon Greeley | 23 | 2 | 25 |
| 2013-08-22 | Gary Rudolph | 76 | 52 | 128 |
| 2013-08-12 | Brandon Greeley | 29 | 5 | 34 |
| 2013-08-08 | Bardia Dejban | 4 | 4 | 8 |

FIG. 4D

| RAW | SOURCE START | SOURCE LENGTH | TARGET START | TARGET LENGTH |
|---|---|---|---|---|
| @@ -1, 3 +1, 9 @@ | 1 | 3 | 1 | 9 |
| @@ -5, 16 +11, 10 @@ | 5 | 16 | 11 | 10 |
| @@ -22, 3 +22, 7 @@ | 22 | 3 | 22 | 7 |

| Velocity Score | | |
| --- | --- | --- |
| | Formula | Comments |
| Org | Total lines of code across all repos / time OR<br>Total files across all repos / time OR<br>Total commits across all repos / time | Time = daily, weekly, monthly and yearly |
| Repo | Total lines of code for the repo / time OR<br>Total files for the repo / time OR<br>Total commits for the repo / time | |
| Person | Total lines of code for the individual / time OR<br>Total files for the individual / time OR<br>Total commits for the individual / time | |

FIG. 6B

| Churn Score | | |
| --- | --- | --- |
| | Formula | Comments |
| Org | Number of same files touched across all repos last X commits + Number of same lines touched across all repos last X commits | X = 5, 10 or 20<br>Will need to test this number during baseline, but anything more than the past 20 commits and the expectation is that most projects would have a high degree of churn. We need a clean distribution across various source projects, not similar churn scores across all source code. |
| Repo | Number of same files touched for the repo last X commits + Number of same lines touched for the last repo last X commits | |
| Person | Number of same files touched for the individual last X commits + Number of same lines touched for the individual last X commits | |

FIG. 6C

| Skill Score | | |
|---|---|---|
| | Formula | Comments |
| Org | Detect patterns used across source code across all repos (Language dependent) + Detect file naming used across source code across all repos (Language dependent) + Detect number of lines per file across all repos (Language dependent) | Each language has its own set of guidelines and advanced syntax. We won't be looking at architecture or source security/appropriateness initially as there are a lot of tools for this already.<br><br>Each language also has file naming and line count expectations, and beginning programmers will make some mistakes that are easy to catch while advanced programmers will likely score higher here. |
| Repo | Detect patterns used across source code for the repo (Language dependent) + Detect file naming used across source code for the repo (Language dependent) + Detect number of lines per file for the repo (Language dependent) | |
| Person | Detect patterns used across source code for the individual (Language dependent) + Detect file naming used across source code for the individual (Language dependent) + Detect number of lines per file for the individual (Language dependent) | |

FIG. 6D

SYSTEMS, METHODS, AND ALGORITHMS FOR SOFTWARE SOURCE CODE ANALYTICS AND SOFTWARE METADATA ANALYSIS

TECHNICAL FIELD

The present disclosure relates generally to source control management systems, and more particularly to ascertaining history of a project, also known as commit data.

BACKGROUND

Software systems are complex to write, maintain, and manage. The need arises for an organization manager, leader or executive to obtain a simple and holistic view of their organizations source code health without having to spend a lot of time digging into the source code itself, or using tools that take hours to setup and only provide software engineering feedback. For example, an executive wants to be able to know who's writing the most source code, the best source code, which projects are suffering from low code contribution or low skill, and how each team member is affecting other team member's source code contributions.

While operating a software company, the amount of work to manage quality of work and overall engineer contributions becomes more difficult with growth (internal and sales). Finding the time to go through source code, line-by-line is unfeasible. There are various source code review products, such as Crucible, Black Duck, HP Fortify and others. Those tools are time consuming to setup and interpret.

What is desired is a system capable of summarizing data for all of a software company's engineers, repos (projects) and the entire organization so the executives and managers of the organization can make better decisions. The system should be very easy-to-understand, fast, and meaningful analysis of source code to help differentiate the bad engineers and projects from the great ones to assist in strategic decisions. For example, how to form teams, which project to put John Doe engineer, which engineers to pair with one another, which projects need more resources, etc.

SUMMARY

The present disclosure provides a system and method capable of summarizing data for all of a software company's engineers, repos (projects) and the entire organization so the executives and managers of the organization can make better decisions.

In a first example, the system is configured to fetch and mine data related to the end-user's organization, projects, people, source code and source code metadata and use proprietary algorithms to calculate various scores such as Velocity, Churn and Skill. These scores may be combined in a weighted calculation over time to provide a Master Score; the combined score for a specific context. The end-user is able to see the various scores, including the Master Score, for various contexts such as the Organization, repos (projects) or individuals (engineers). The score provides a CTO or VP of Engineering, for instance, with a quick health status that would otherwise be unknown or very time-consuming to obtain.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 3A-J illustrate examples of source code and programming language metadata;

FIGS. 4A-D illustrates samples produced by the summarization engine;

FIGS. 6B, 6C and 6D illustrates scoring of velocity, churn and skill, respectively;

DETAILED DESCRIPTION

This disclosure introduces and/or involves the following terms and definitions:

Source Control Management System (SCM)

Sometimes also referred to as simply Source Control, is a tool used to manage the coding source for a team and track the development of a source file to prevent it from being altered by more than one person at a time.

Source Code

A readable format of step-by-step programming instructions that become translated into machine language to run on computers.

Organization

Organizations simplify management of group-owned repositories (for example: a company's code), expand on a permissions system, and help focus workflow for business and large open source projects.

Repository (Repo)

Every time an engineer commits code, it is stored in a repository. This is sometimes synonymous with the word "project".

Commit

The process that adds code changes to the history of the repository and assigns a commit name to it. This is a local action, as commits must then be pushed to the server.

Contributor

The author or committer of a piece of code. The author and committer may not be the same person, but both are considered contributors. See Committer.

Committer

The individual that adds the source code history to a repository. See Commit.

Velocity

The rate of change. It includes the number of lines added, deleted or changed within a period of time (typically per day).

Churn

The number of lines of code that are edited again. For example, if lines 20-30 in a source code file are touched every day for a week, this may be considered High Churn.

Skill

The ability to do something well. Skill includes a representation of an individual contributor's level of mastery of a specific language, project (repo) or software architecture.

Figure 1:
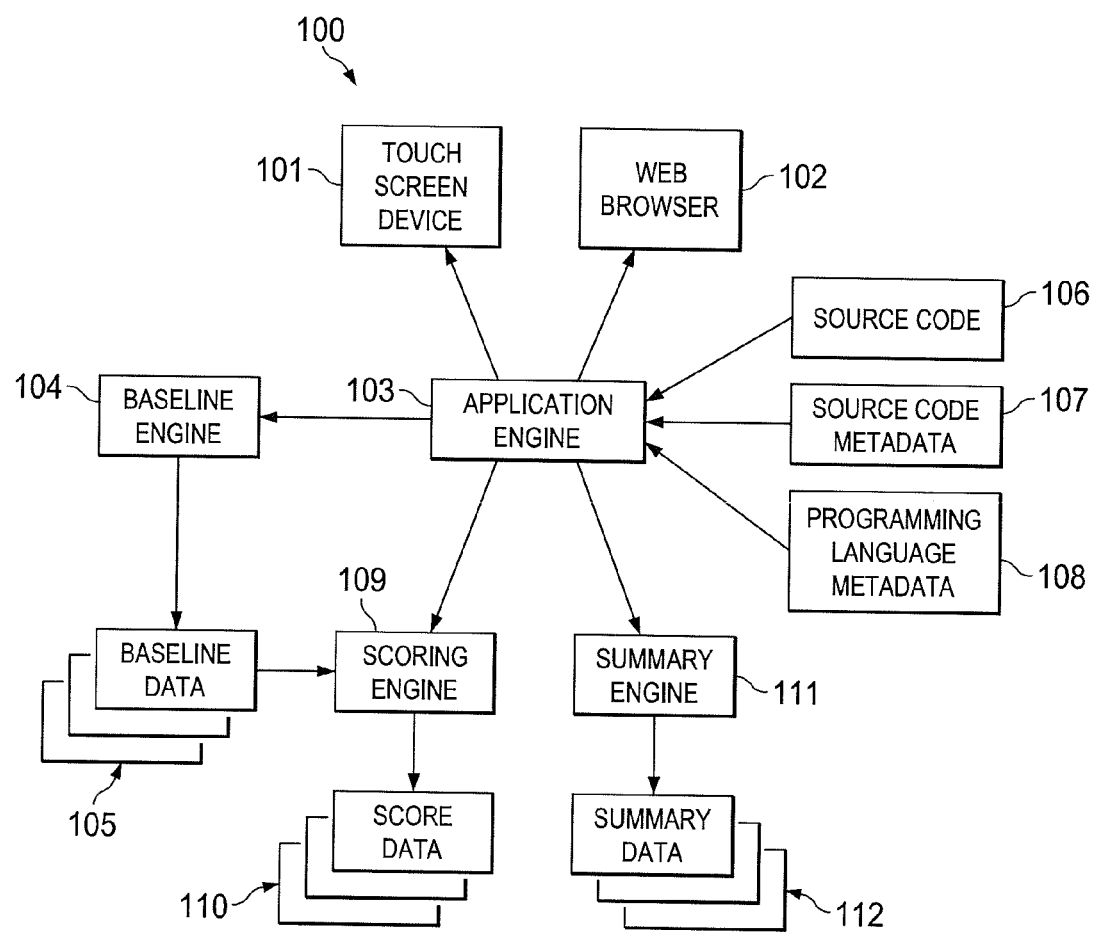
FIG. 1 illustrates a high-level system architecture of one embodiment of the disclosure.
Figure 2:
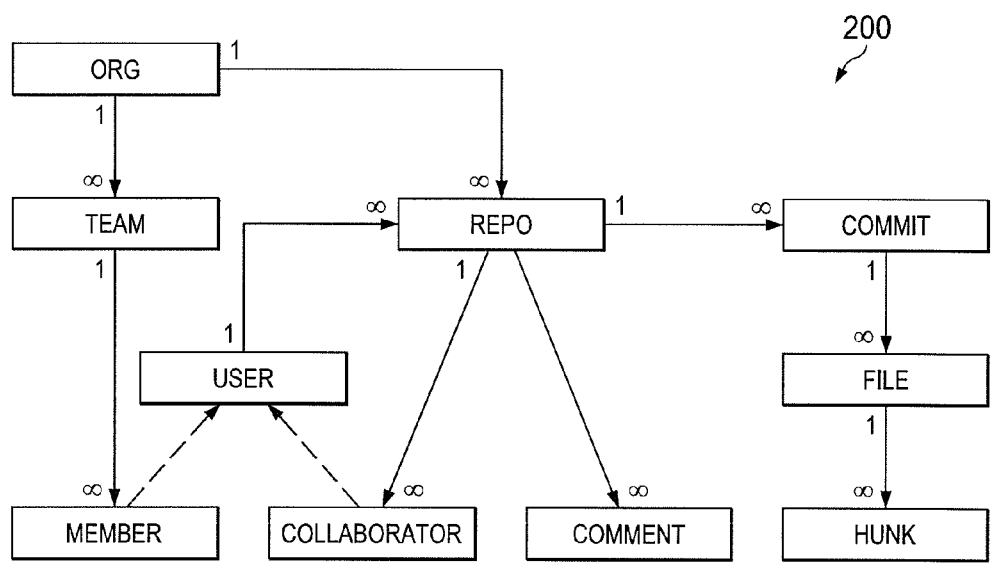
FIG. 2 illustrates source control object structure and relationships.

Referring to FIG. 1, there is shown a high-level architecture of a system 100 according to the present disclosure. The system 100 is configured to be implemented on a computer, such as a PC or a server, within a portable device such as a smart phone or tablet, or on a distributed cloud computing system. The system 100 is configured to obtain source code 106 from public or private repositories with user credentials. System 100 further includes an application engine 103 that is configured to pull source code 106, source code metadata 107 and programming language metadata 108 from source control systems, such as GitHub offered by Codalytics, Subversion, Microsoft TFS, Bitbucket and any other source control system that provide communications over internet protocols. An example of source control object structure and relationships is illustrated at 200 in FIG. 2.

By way of example, the system 100 may operate according to the following methodology. For every source code repository, the application engine 103 obtains one or more source code files 106, source code metadata 107 and programming language metadata 108. Examples of source code and programming language metadata are illustrated in FIGS. 3A-3J. The source code 106, source code metadata 107 and programming language metadata 108 are then sent to a summary engine 111 for processing summarization data. The summarization engine 111 aggregates and adds the additions, deletions and total changes per organization, repository, user and contributor. Summary data 112 samples produced by summarization engine 111 are illustrated in FIGS. 4A-4D. FIG. 4A illustrates organizational summary data at 410. FIG. 4B illustrates repository summary data at 420. FIG. 4C illustrates user summary data at 430, and FIG. 4D illustrates contributor summary data at 430.

The application engine 103 then sends the summary data 112 along with source code 106, source code metadata 107 and programming language metadata 108 to a scoring engine 109. The scoring engine 109 uses algorithms and baseline data 105 to generate more metadata, shown as score data 110. A high-level diagram of the scoring engine can be seen at 500 in FIG. 5.

The first process of the scoring engine 500 comprises the scoring engine 500 going through every file for every commit in every repository, and extracting unified diff hunk information. For every source file changed in a diff patch, the algorithm looks for a pattern that matches: "@@ −1,s +1,s @@". This pattern is known as the hunk range information of a unified diff format. For every occurrence of the above pattern, the algorithm extracts the source start, source length, target start and target length info. This is useful in determining the Churn Score.

The following is a sample unified diff patch:
@@ −1,3 +1,9 @@
+This is an important
+notice! It should
+therefore be located at
+the beginning of this
+document!
+
This part of the
document has stayed the
same from version to
@@ −5,16 +11,10 @@
be shown if it doesn't
change. Otherwise, that
would not be helping to
−compress the size of the
−changes.
−
−This paragraph contains
−text that is outdated.
−It will be deleted in the
−near future.
+compress anything.
It is important to spell
−check this document. On
+check this document. On
the other hand, a
misspelled word isn't
the end of the world.
@@ −22,3 +22,7 @@
this paragraph needs to
be changed. Things can
be added after it.
+
+This paragraph contains
+important new additions
+to this document.

Figures 5, 6A:
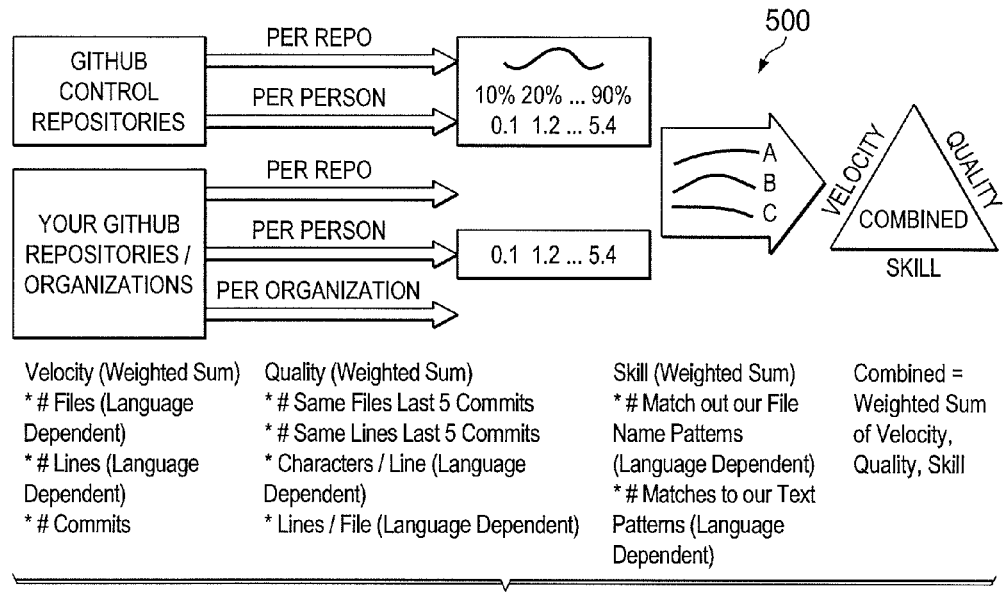
FIG. 5 illustrates a scoring engine.
FIG. 6A illustrates 3 hunks.

The algorithm populates the hunk data store for each file that's part of the commit. From the above sample, three hunks are pulled as shown in FIG. 6A.

Velocity is then calculated for every repository and contributor, for each day, week, month and year, using the velocity score algorithm(s) as shown in FIG. 6B. Churn is calculated for every repository and contributor, for each day, week, month and year, using the churn score algorithm(s) in FIG. 6C. Skill is then extracted for each repository and contributor, for each day, week, month and year using the skill algorithm(s) shown in FIG. 6D. Skill is calculated by crawling through each line of code in the source file, checking for the existence of advanced or high-competency terms, and adding a positive integer 1 one (1) to for each occurrence. Each advanced or high-competency term comes from academic knowledge of each programming language, in combination with domain experience of engineering professionals that specialize in each one of the programming languages that are being scored. To generate a master score, velocity, churn and skill are added and the total is then divided by three, giving an average. Velocity score, churn score, skill score and master score is then output to the score data 110 for each organization, user, repository and contributor in a daily, weekly, monthly and yearly format.

Periodically (hourly, daily and weekly), the application engine 103 invokes the baseline engine 104. The baseline engine 104 is responsible for generating comparison data from popular and well-architected public source repositories that have been created by well-known companies and skilled engineers. Hundreds of publicly available repositories of various programming languages are pulled by the application engine 103 and sent to the baseline engine 104. An administrator of system 100 can define the repositories that are included in this process, and the application engine 103 is configured to scan popular source control managements systems online and automatically select the best ones using data and popularity criteria. Baseline data 105 is then output for each repository. Baseline data 105 contains programming language, architecture, skill, source code metadata and popularity information for each of the repositories. Baseline data 105 is used by the scoring engine 109 as a measurement and point of reference so the scoring engine 109 can provide more accurate output based on learned skill levels, architectures and other source code metadata for those popular repositories.

When an end-user views the display of information using a touch screen device 101 or a web browser 102, information is presented in a hierarchical format as can be seen in FIGS. 7A-7L depicting wireframes of a graphical user interface, and FIGS. 8A-8G depicting a graphical user interface of a tablet wherein like numerals refer to like elements.

Figure 7A:
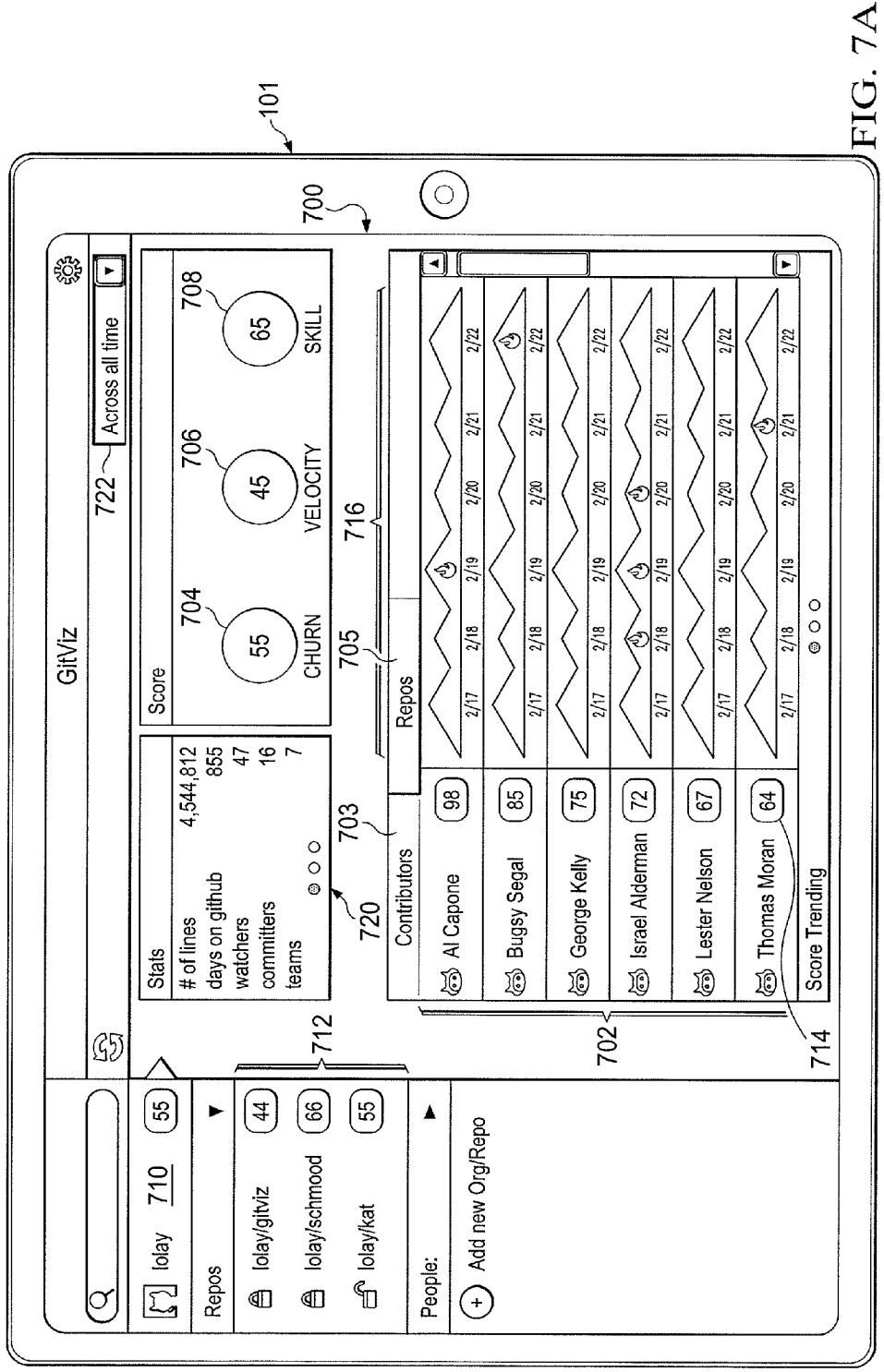
FIGS. 7A-7L illustrate wireframes of a graphical user interface.

FIG. 7A depicts a screen shot of score trending at 700 for a plurality of contributors 702. This screen shot is produced in response to selecting the contributors window 703. Three (3) scores are shown for each contributor 702, shown as churn 704, velocity 706 and skill 708. A company field is shown at 710 that is associated with the data shown. A plurality of repos associated with the selected company are shown at 712. Fields 704, 706 and 708 depict the average scores for the contributors 702 of the selected company 710, and individual scores for each contributor 702 is shown adjacent the respective name at 714. The score trending over time is shown in window 716.

Additional data is shown in window 720, including the total number of lines of code for this company, the number of days of activity for this company, the number of watchers, the number of committers, and the number of teams. Drop down window 722 allows the user to select different metrics for displaying data, with the selection "across all time" being selected for this screen shot 700.

Figure 7B:
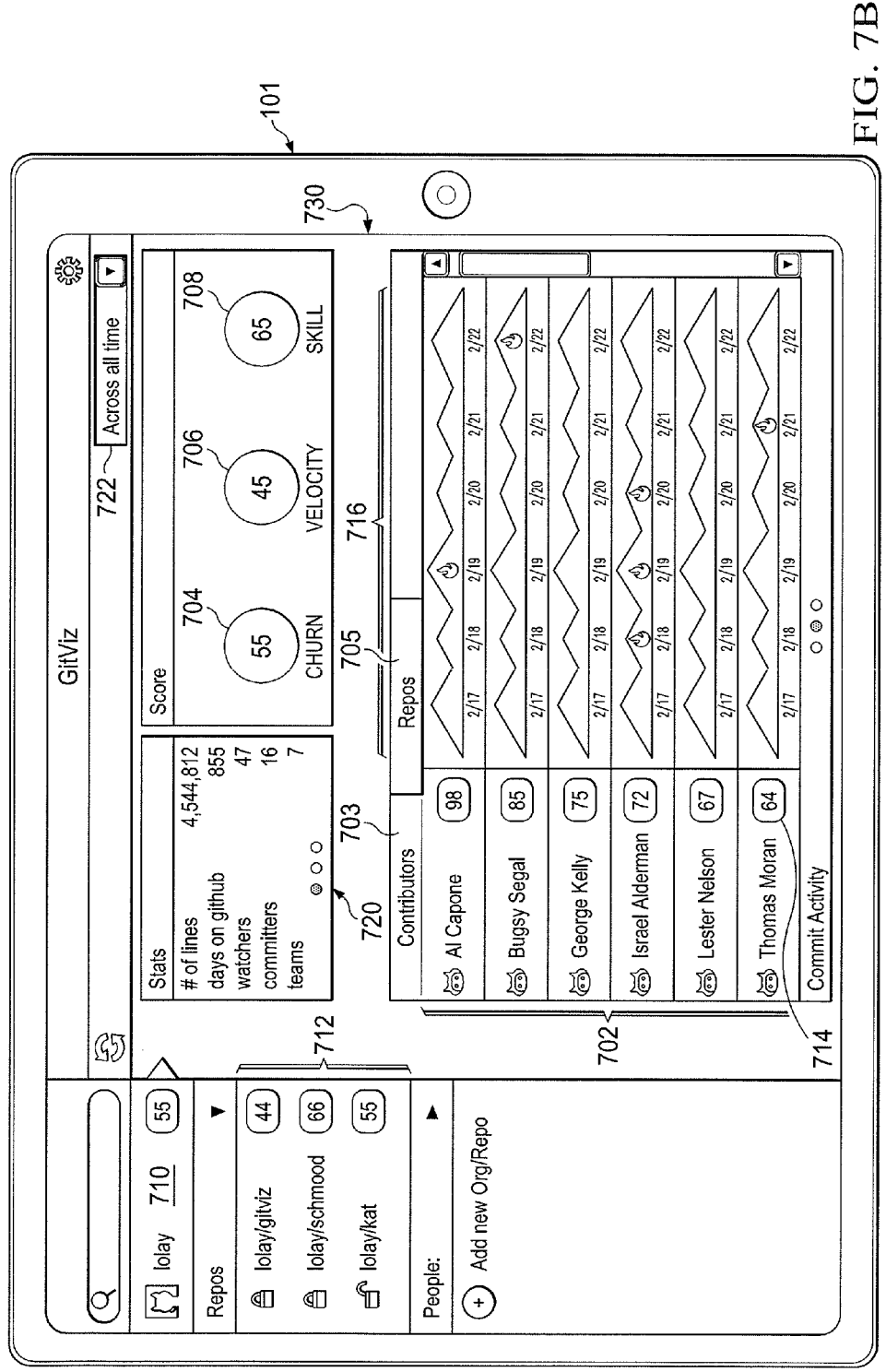

FIG. 7B depicts commit activity in screenshot 730 for the plurality of contributors 702.

Figure 7C:
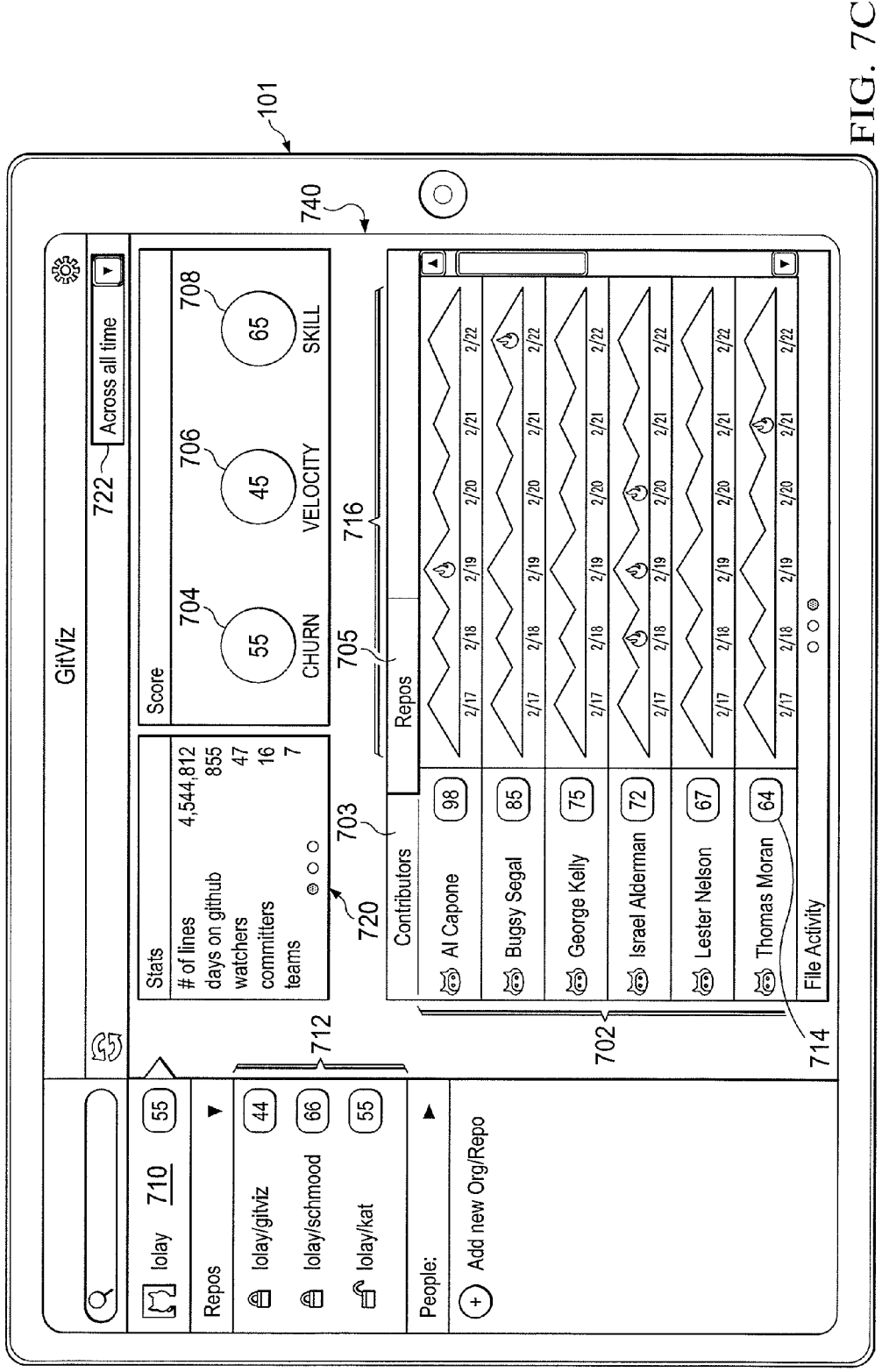

FIG. 7C depicts file activity in screenshot 740 for the plurality of contributors 702.

Figure 7D:
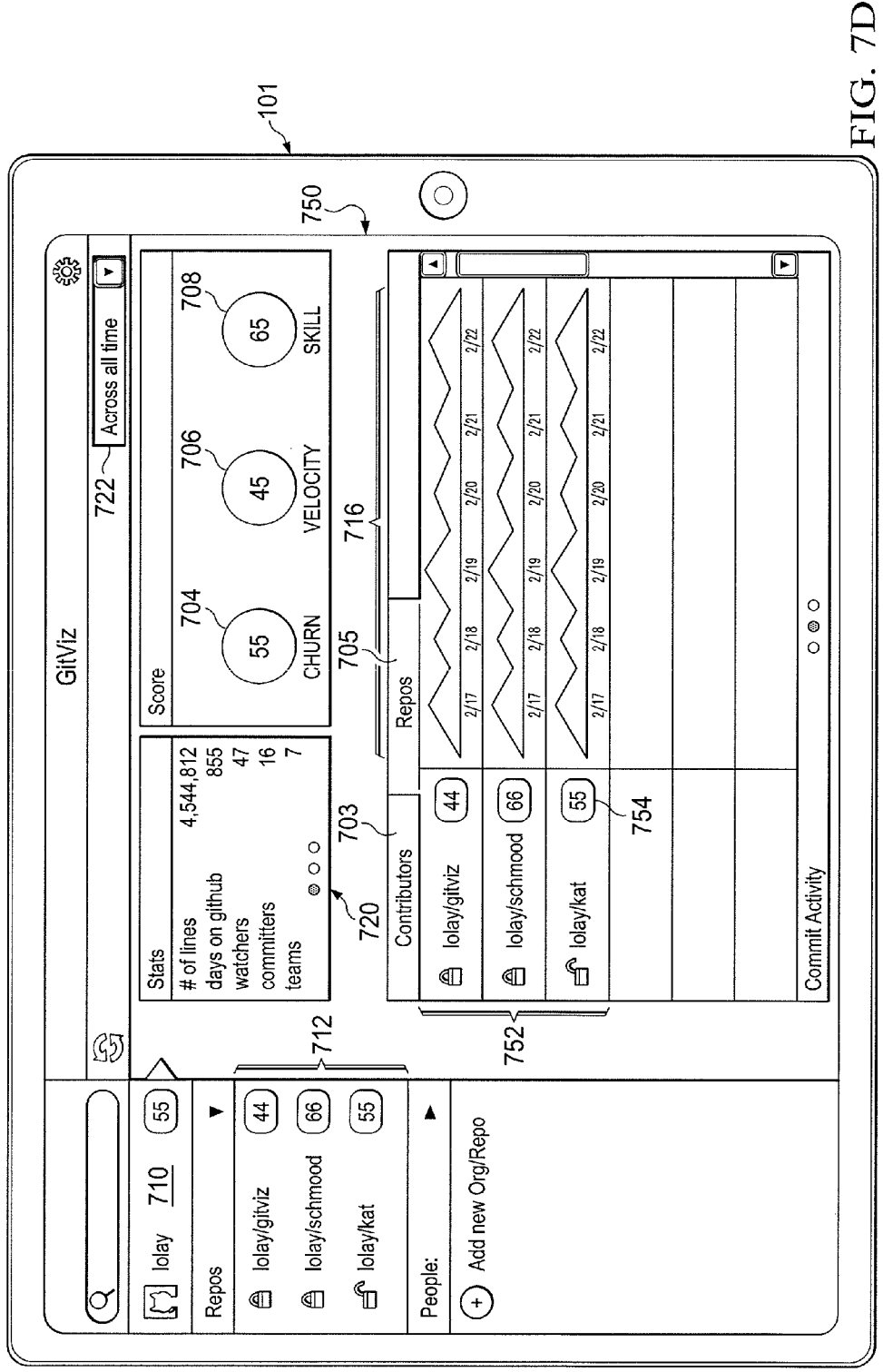

FIG. 7D depicts commit activity in screen shot 750 for the various repos 752 in response to the repos window 705 being selected. Each repo 752 for selected company 710 has an associated average score displayed adjacent the respective repo at 754. The associated activity of each repo over time is shown in window 716.

Figure 7E:
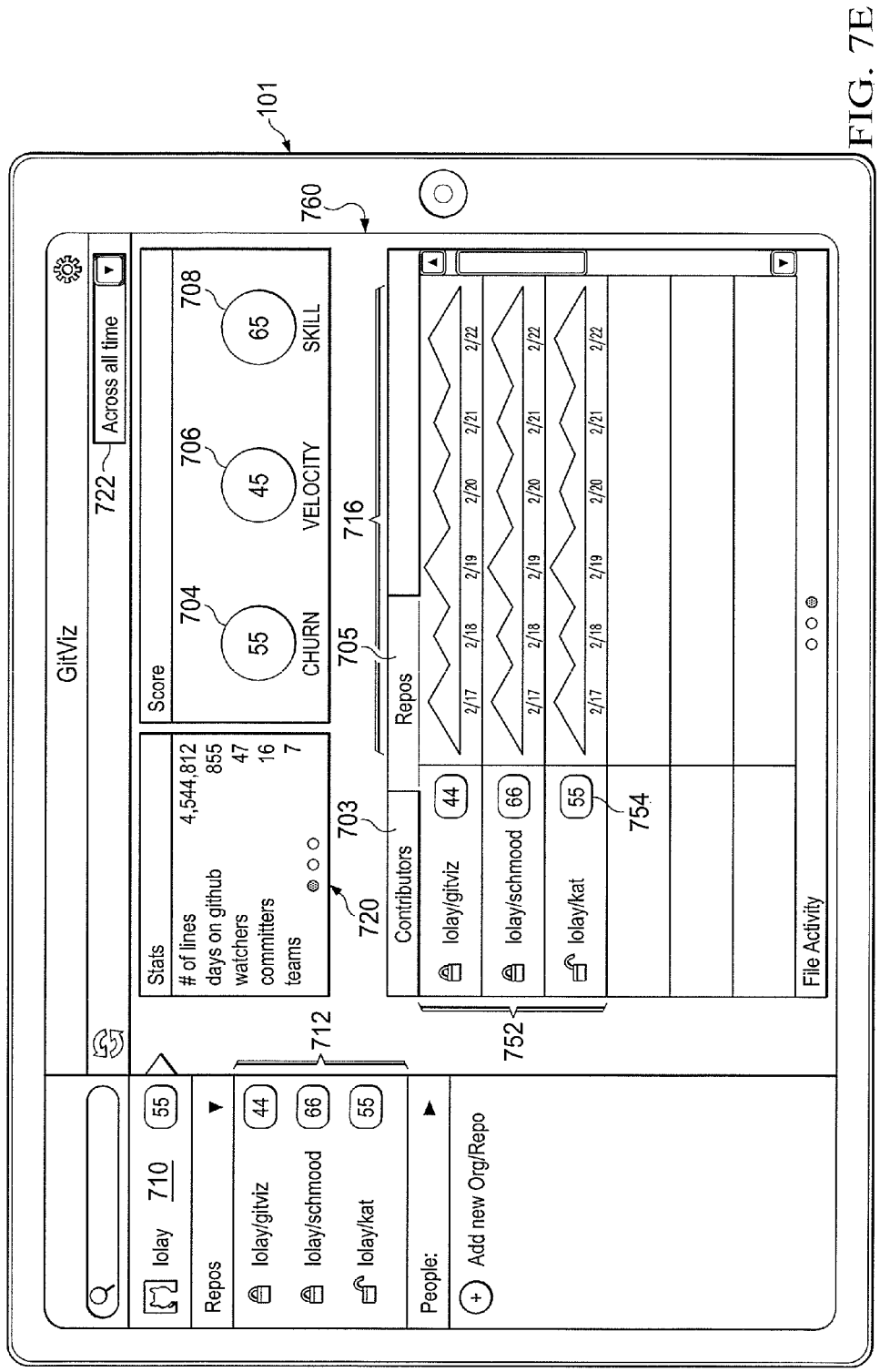

FIG. 7E depicts file activity in screen shot 760 for the various repos 752 in response to the repos window 705 being selected.

Figure 7F:
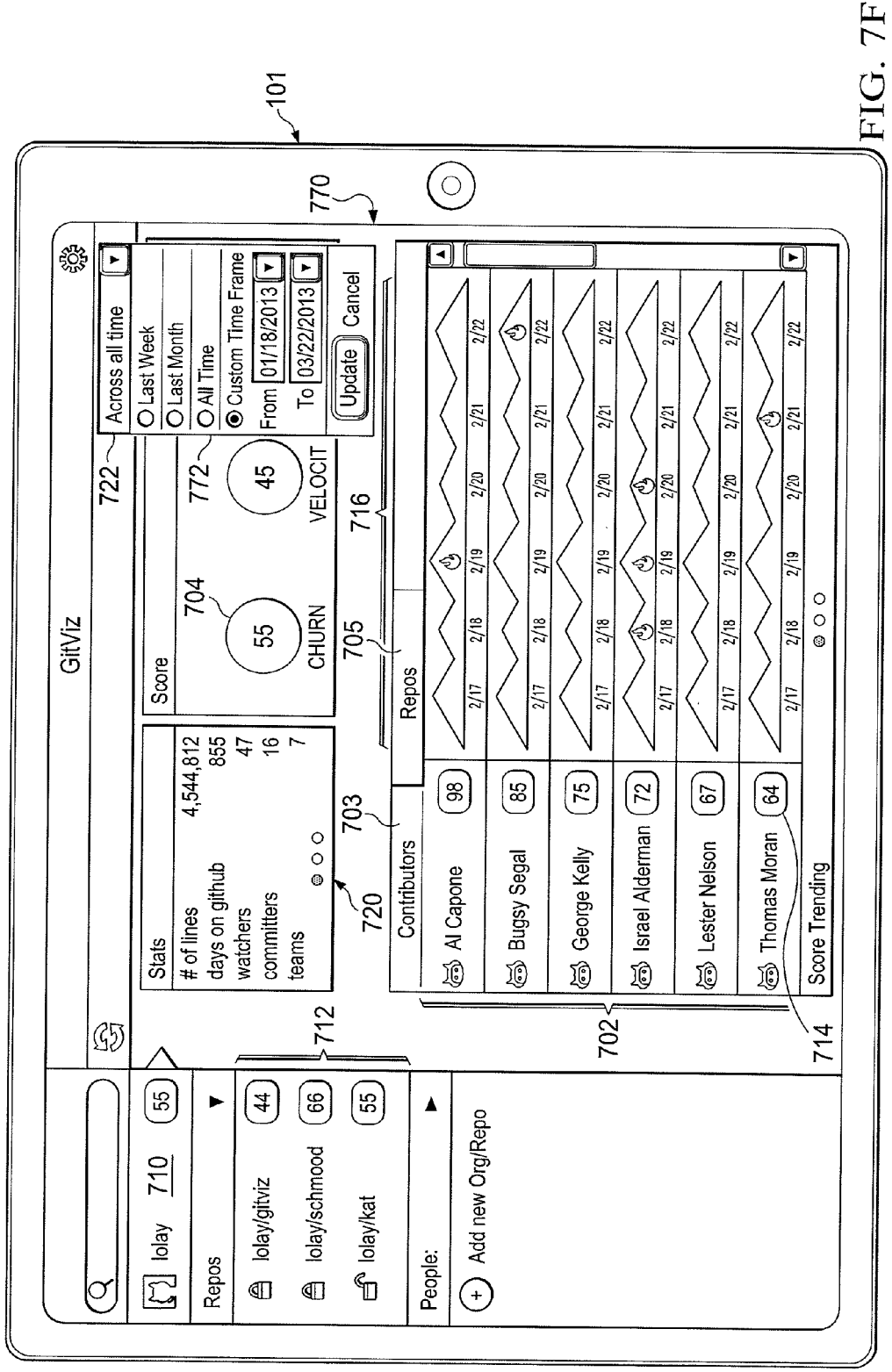

FIG. 7F depicts score trending for the plurality of contributors 702 in screen shot 770 wherein the user has selected a specific user defined time period at 772. This enables a user to appreciate more detailed information over a specific time period.

Figure 7G:
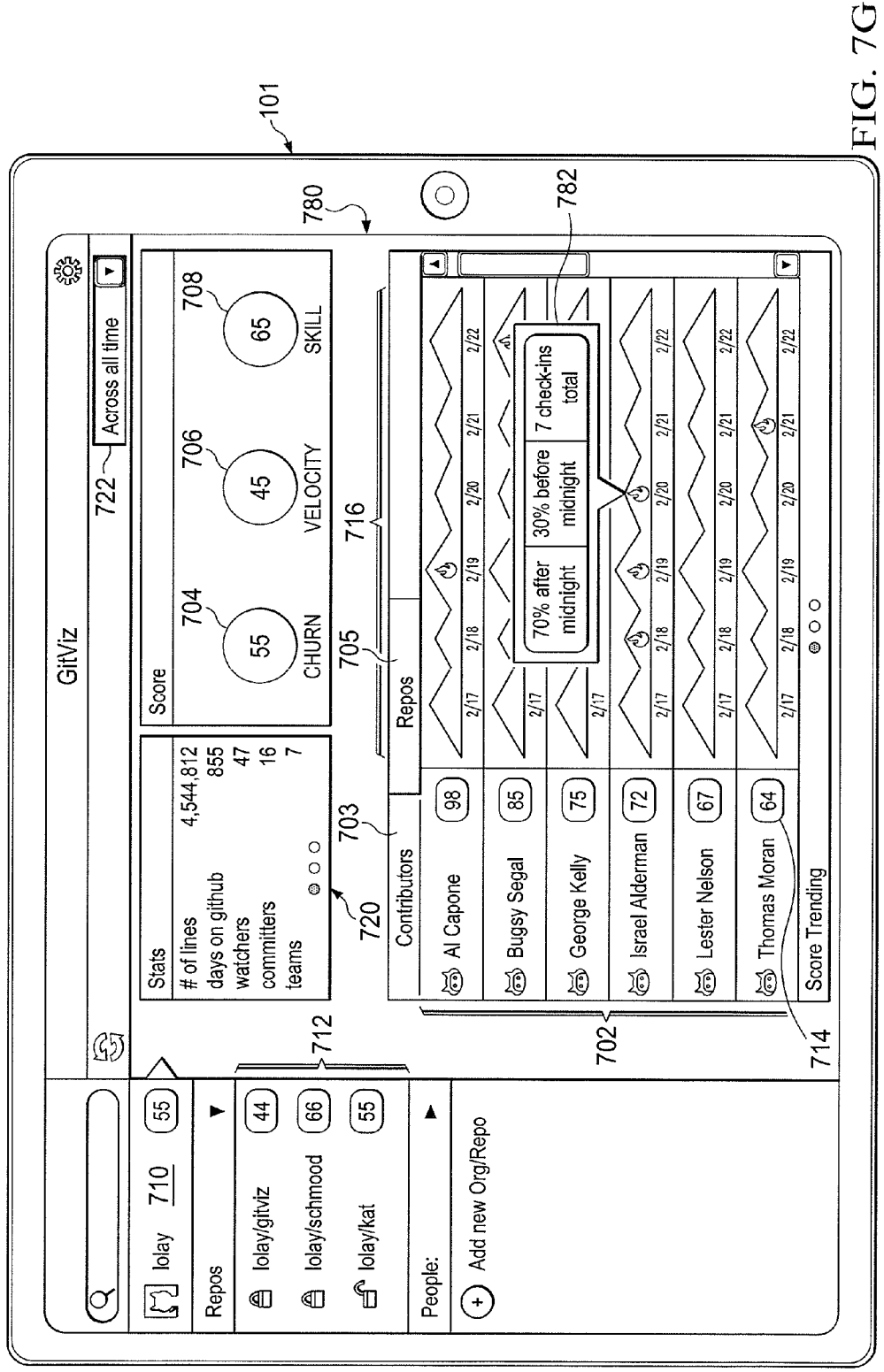

FIG. 7G depicts score trending for the plurality of contributors 702 in screen shot 780, wherein the user has selected a specific contributor such that a window 782 pops up and displays a summary of the user's activity as a function of different time periods in a day.

Figure 7H:
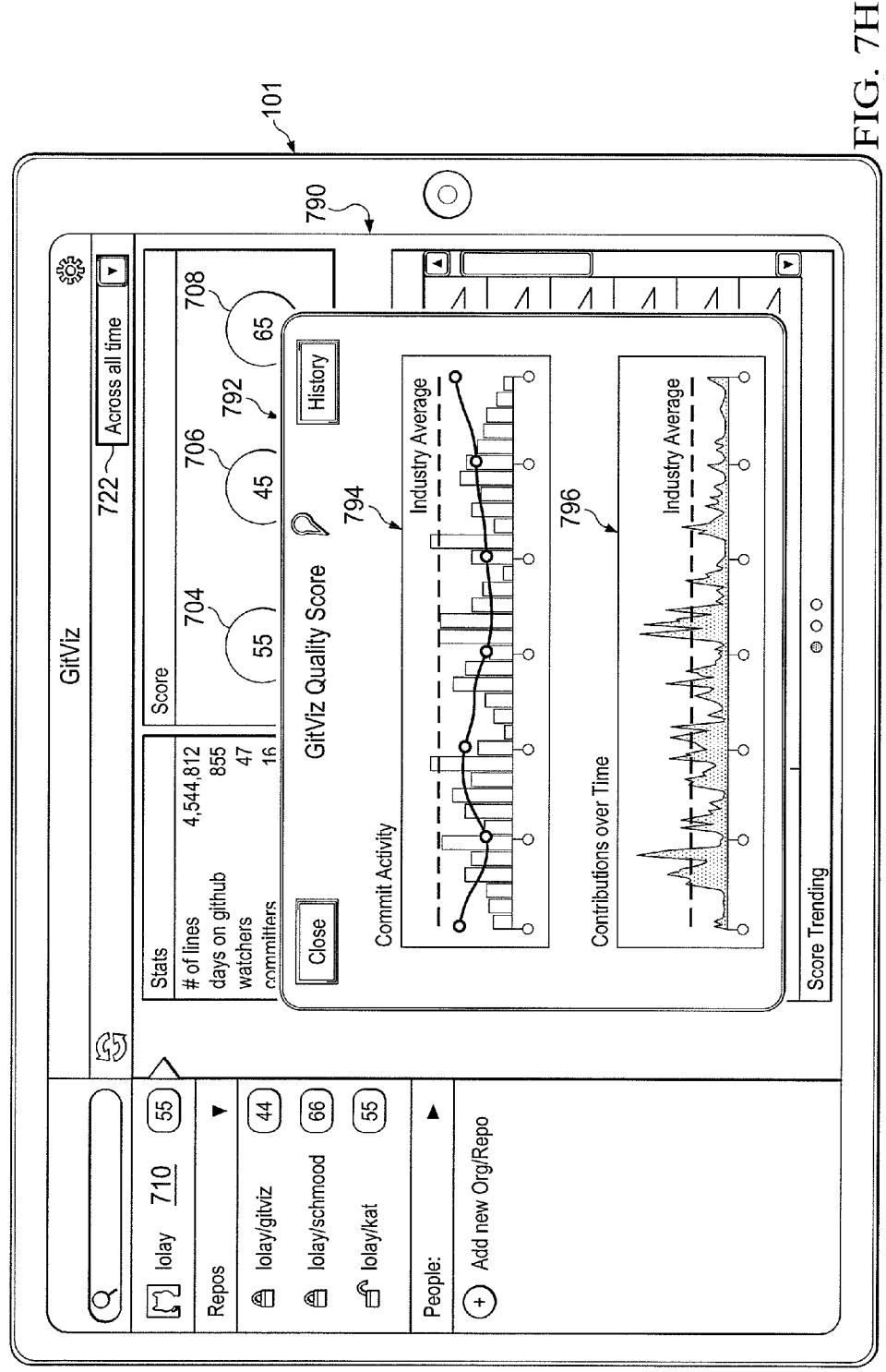

FIG. 7H depicts a screen shot 790 including a detailed pop up window 792 created in response to a user selecting window 704, such as by positioning a cursor over the window 704 and clicking. Window 792 provides the user a top level display of commit activity over time compared to an industry average at 794, as well as contributions over time compared to an industry average at 796.

Figure 7I:
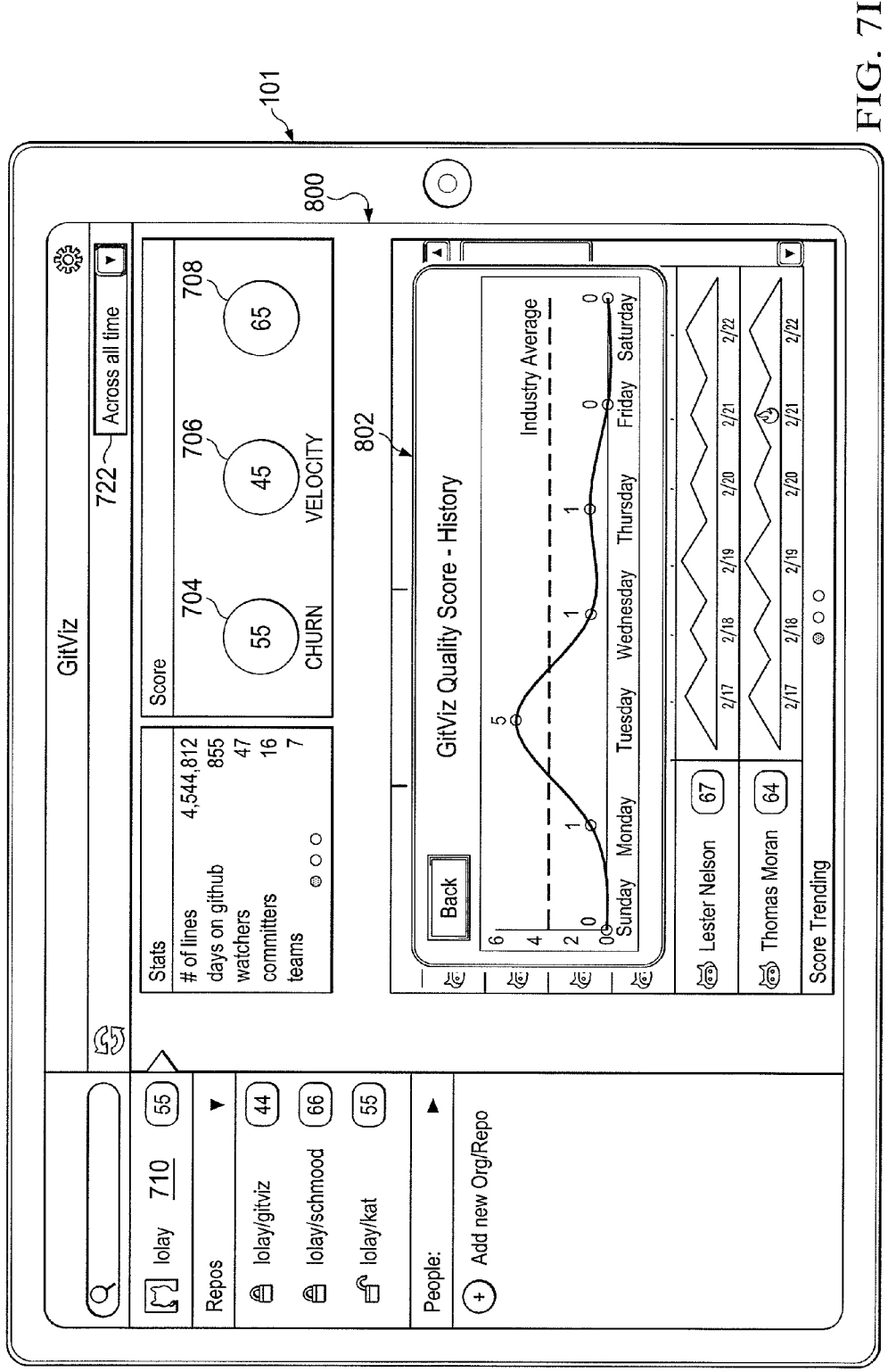

FIG. 7I depicts a screen shot 800 including a detailed pop up window 802 illustrating a quality score history compared to an industry average over time.

Figure 7J:
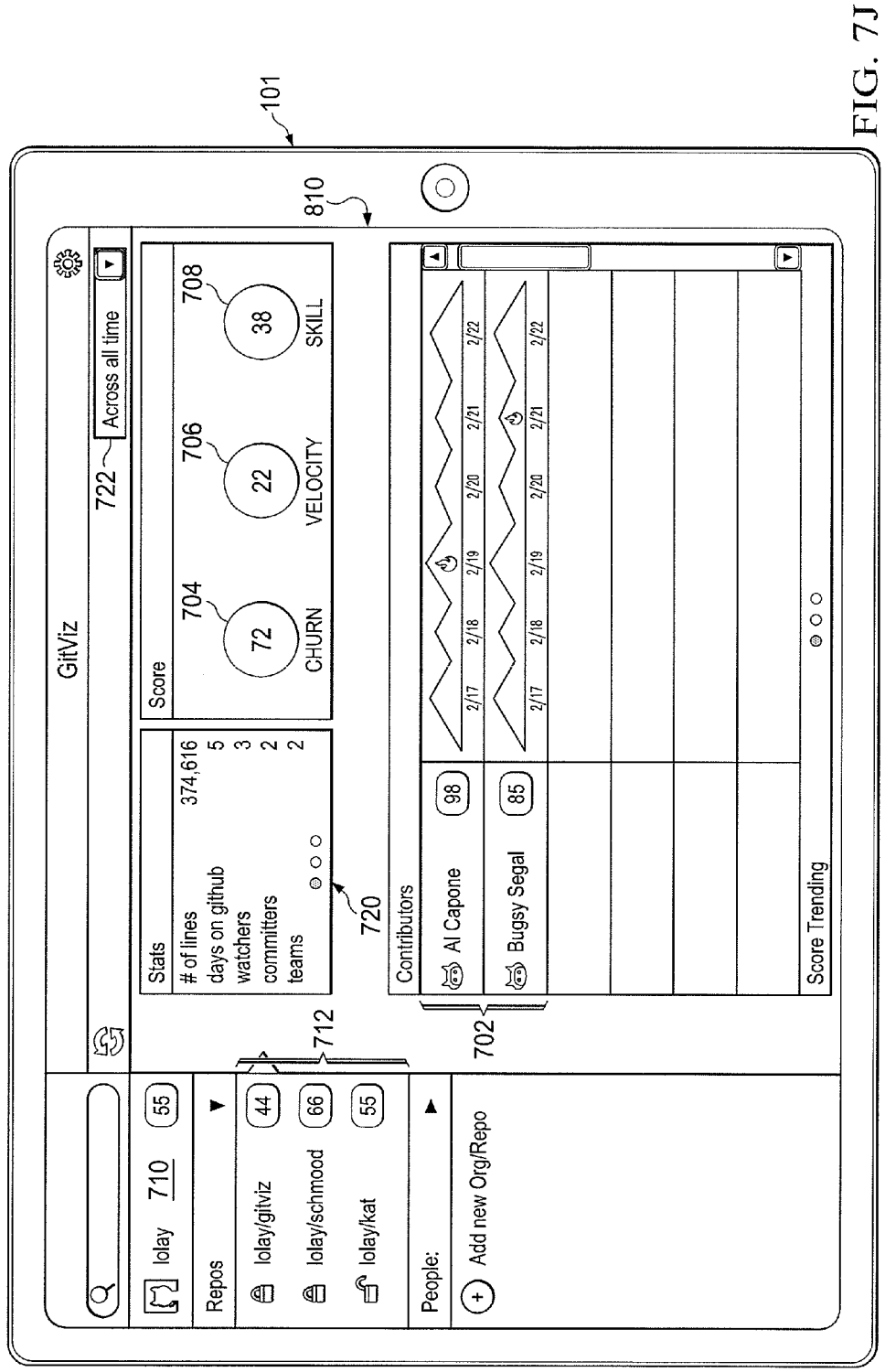

FIG. 7J depicts a screen shot 810 illustrating score trending for 2 selected contributors, a subset of all contributors 702. The average scores for this subset of users 702 are shown in windows 704, 706 and 708. This window helps a user understand the productivity of a subset of contributors such as an analysis of a team of contributors can be appreciated.

Figure 7K:
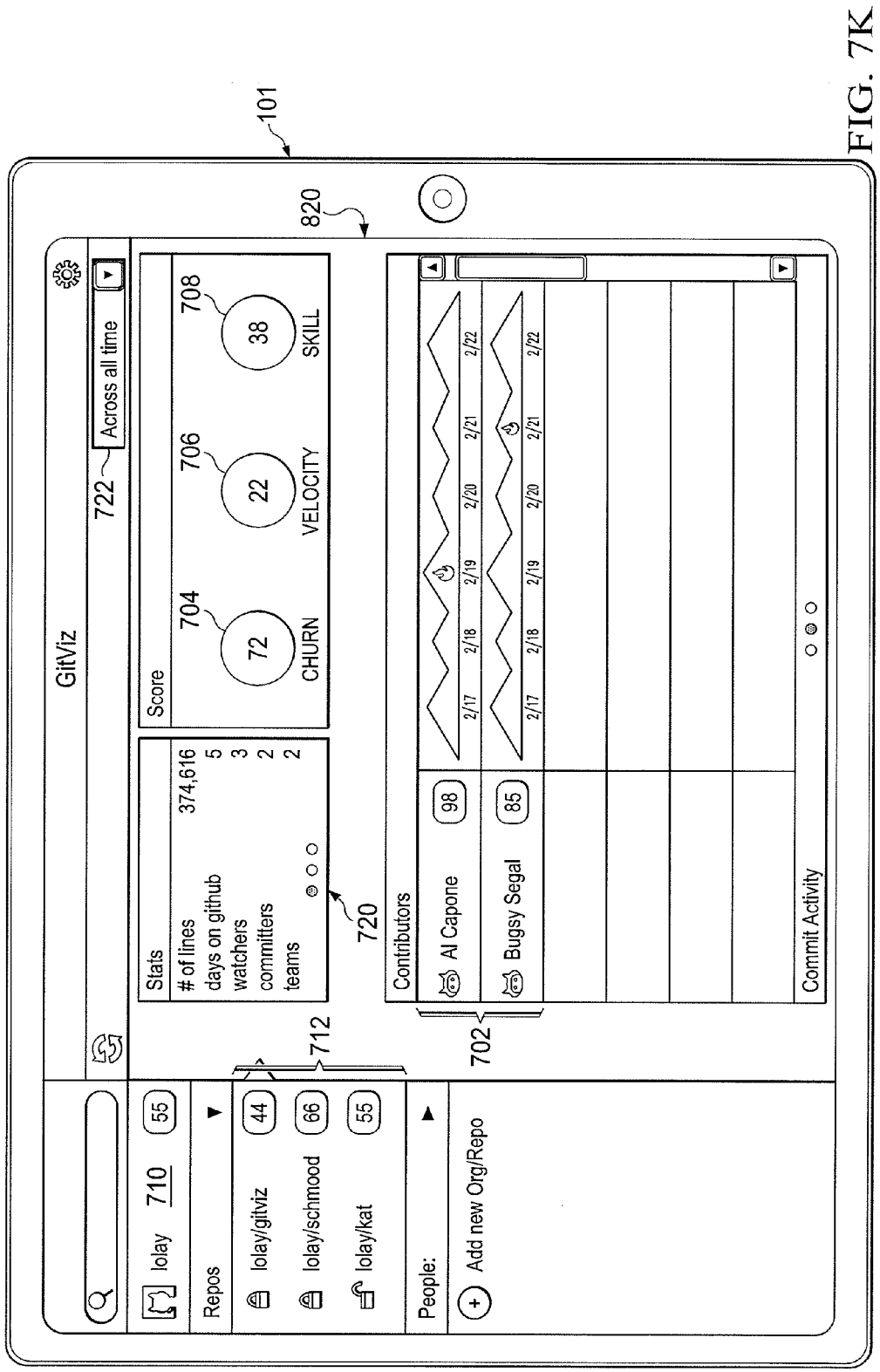

FIG. 7K depicts a screen shot 820 illustrating commit activity for 2 selected contributors, a subset of all contributors 702.

Figure 7L:
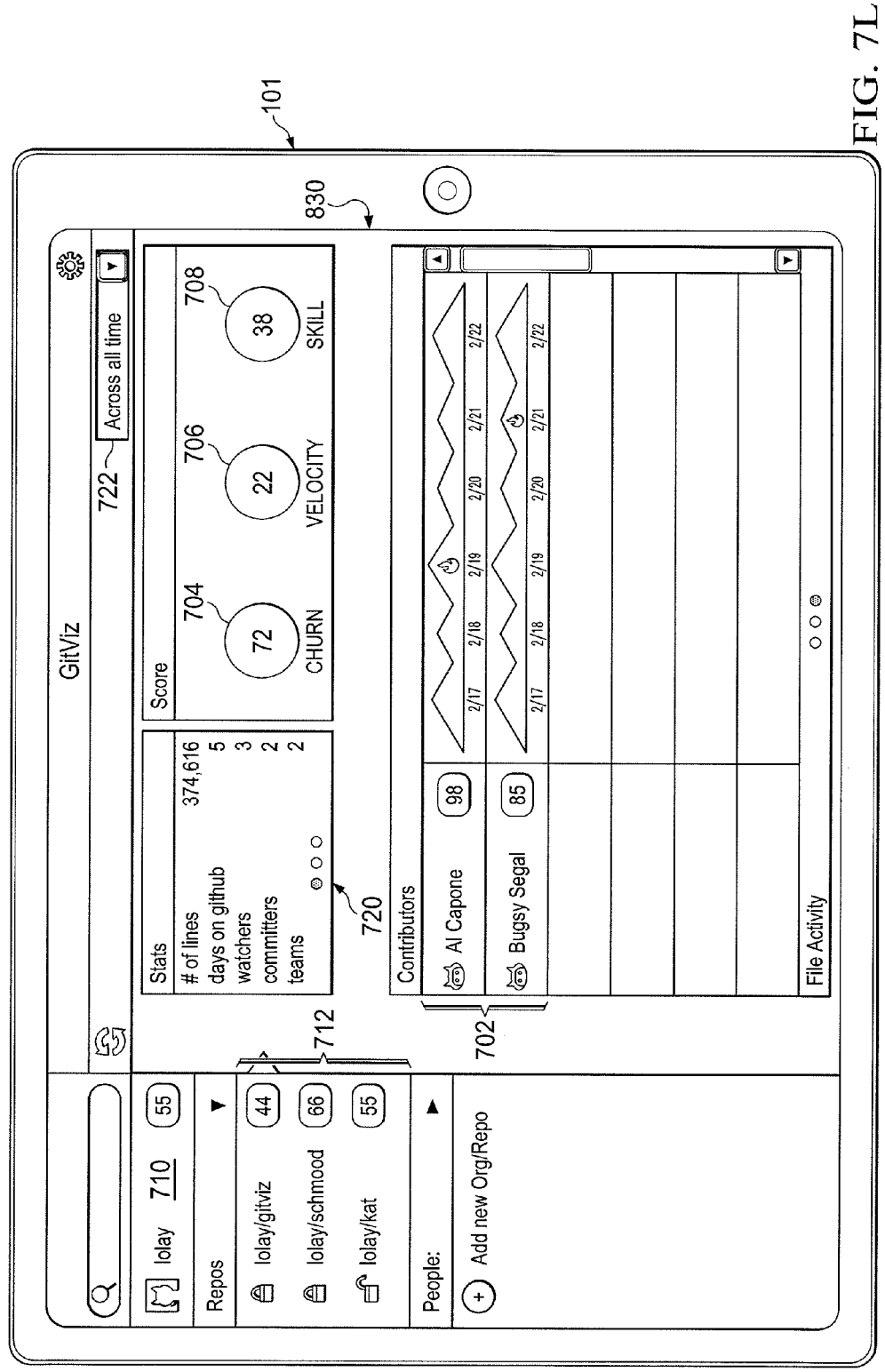

FIG. 7L depicts a screen shot 830 illustrating file activity for 2 selected contributors, a subset of all contributors 702.

FIGS. 8A-8G depict additional embodiments of this disclosure, including screen shots showing score trending similar to that shown in FIGS. 7A-7L wherein like numerals refer to like elements.

Figure 8A:
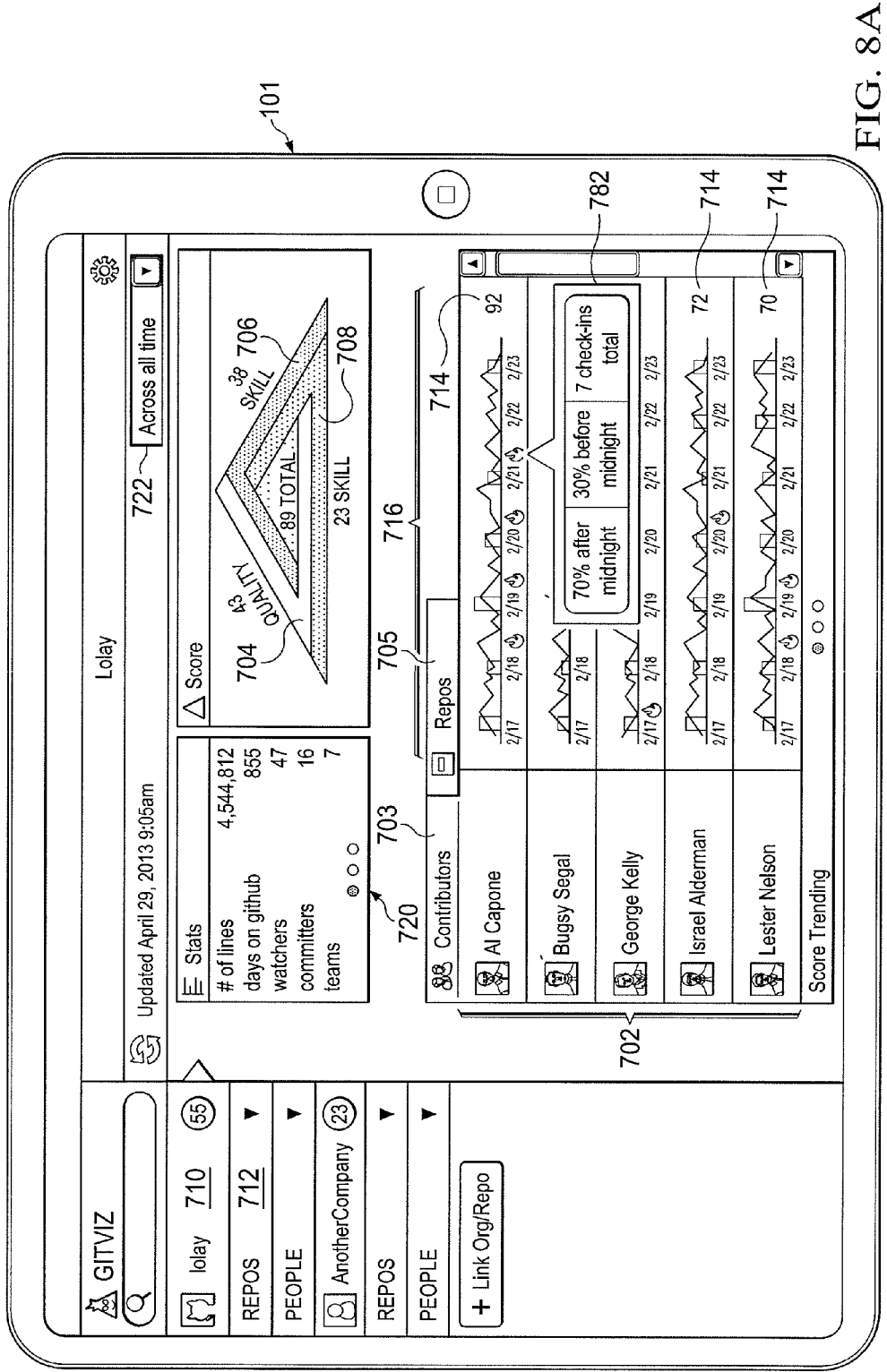
FIGS. 8A-8G illustrate screenshots of a graphical user interface of a tablet.

FIG. 8A depicts score trending for the plurality of contributors 702, wherein the user has selected a specific contributor 702 such that window 782 pops up and displays a summary of the user's activity as a function of different time periods in a day.

Figure 8B:
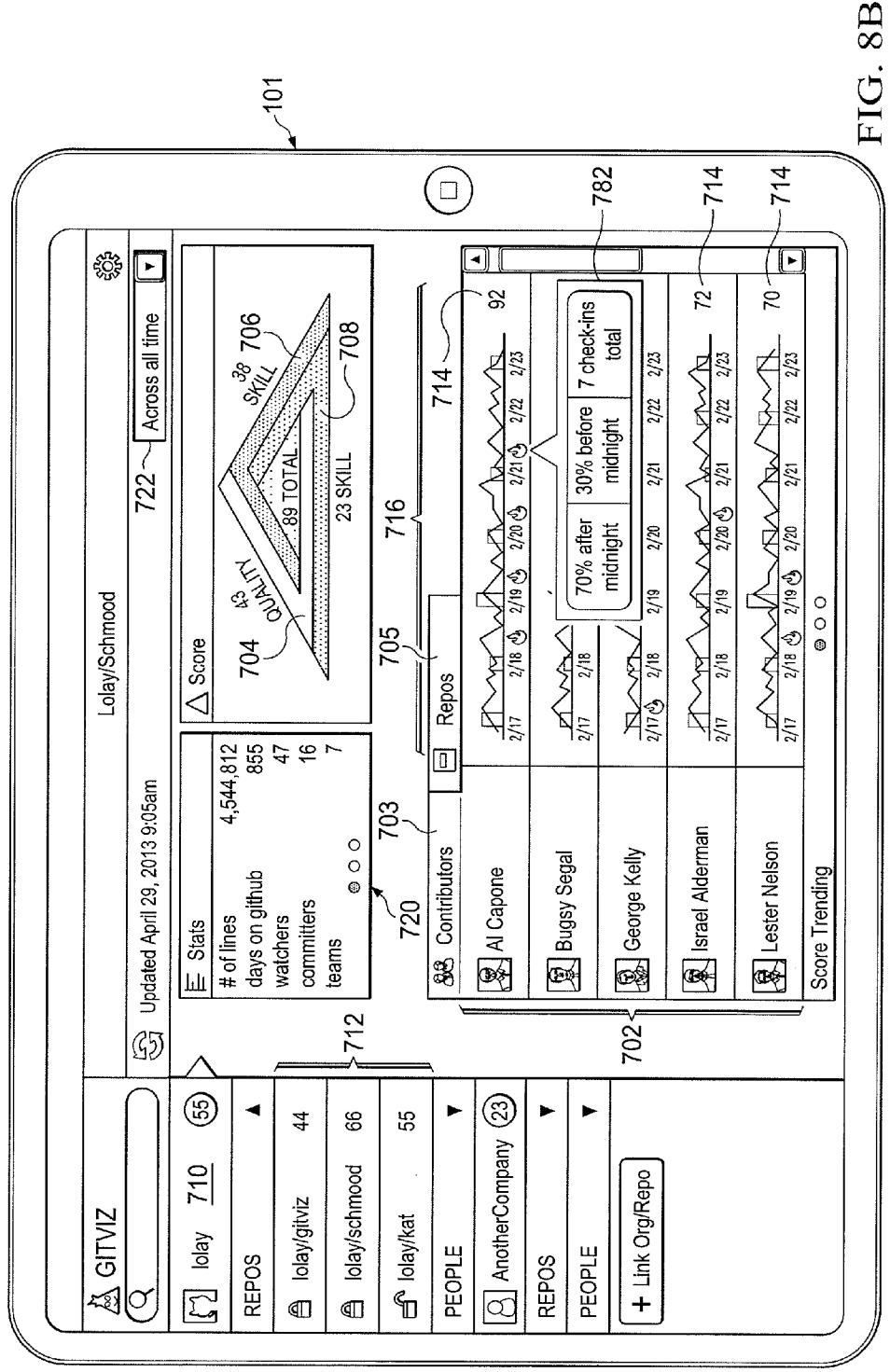

FIG. 8B depicts the repos 712 of company 710.

Figure 8C:
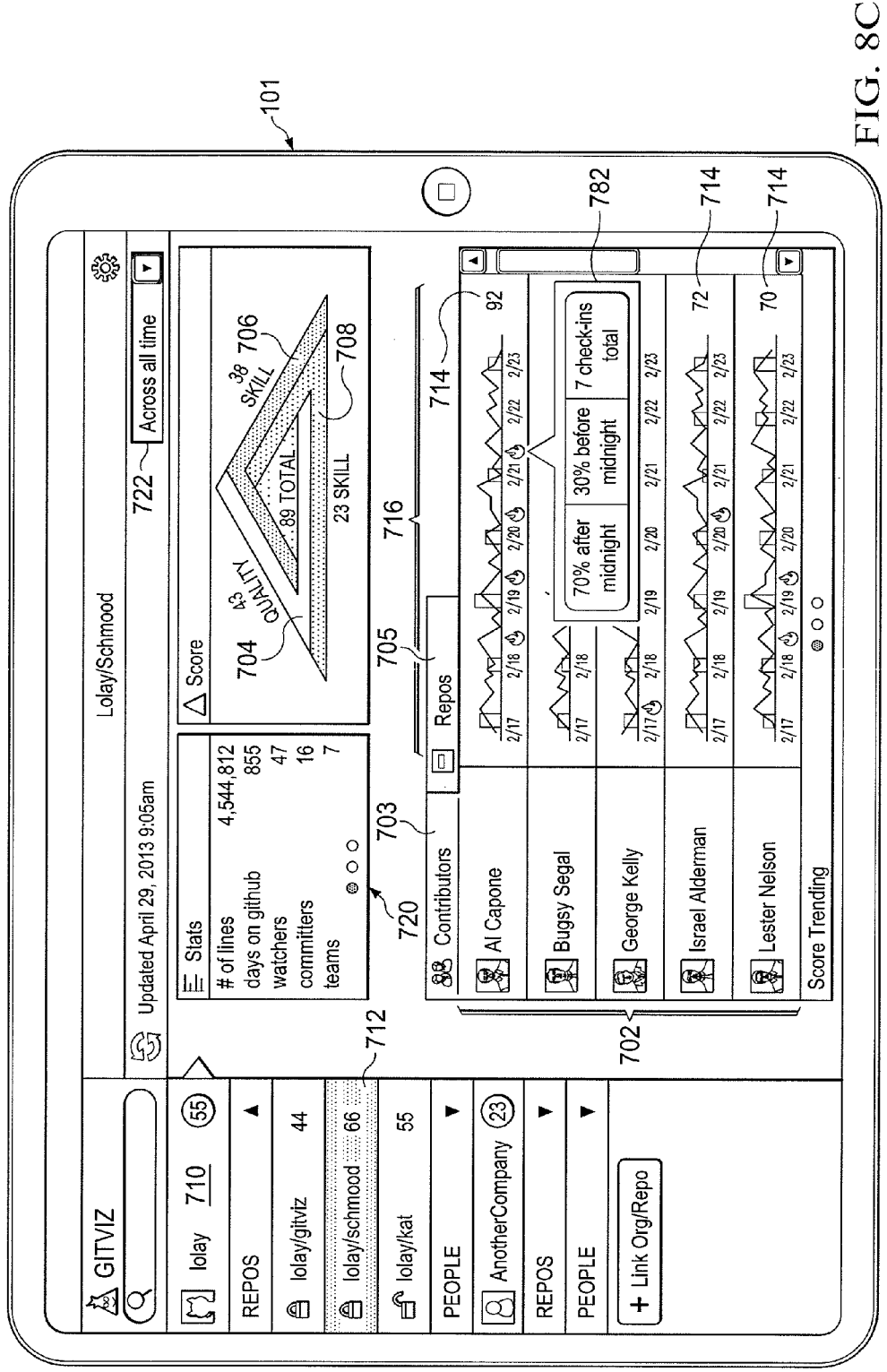

FIG. 8C shows a selected repo 712.

Figure 8D:
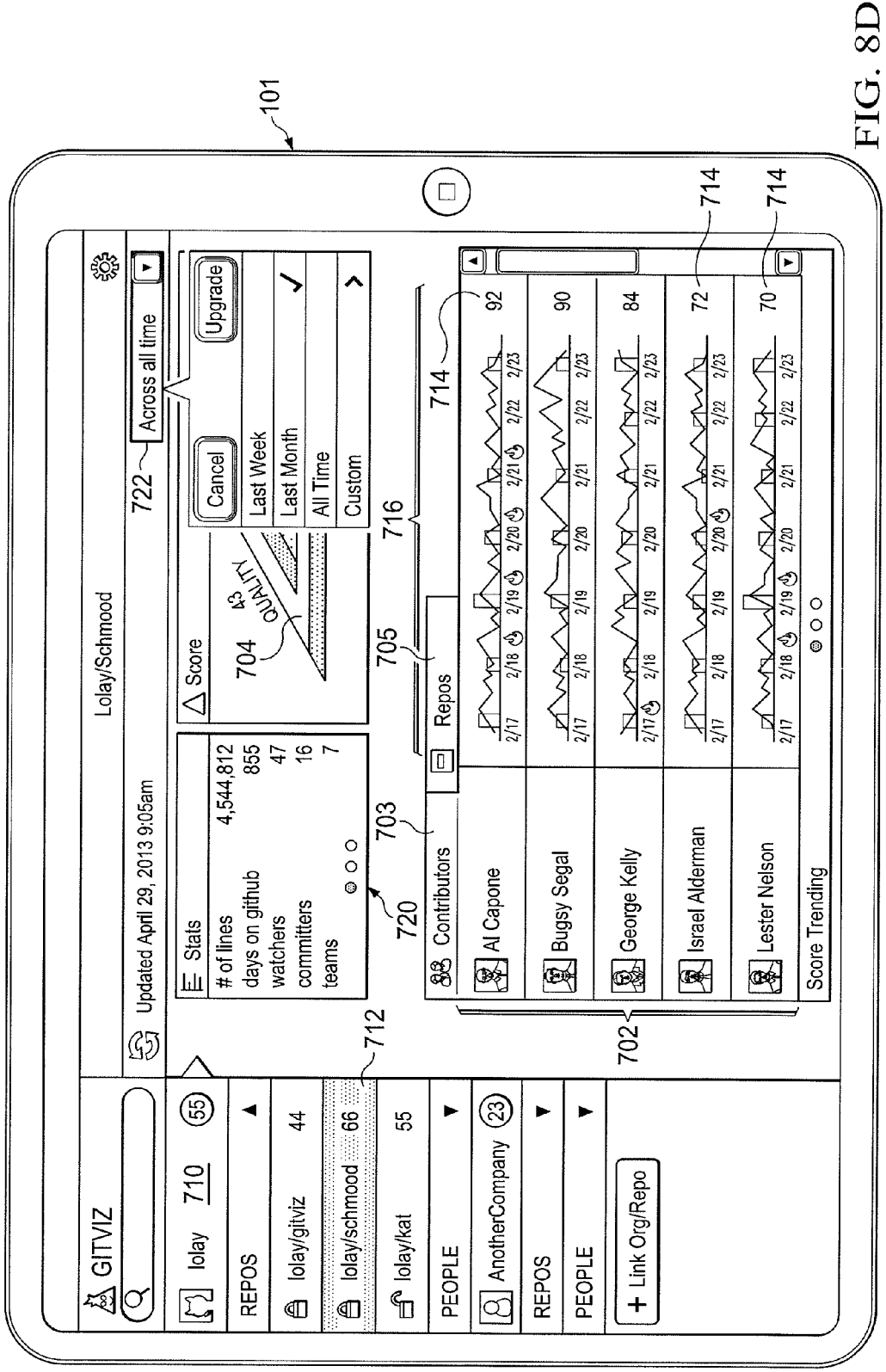

FIG. 8D shows the option to select a time period from dropdown window 722 for displaying data.

Figure 8E:
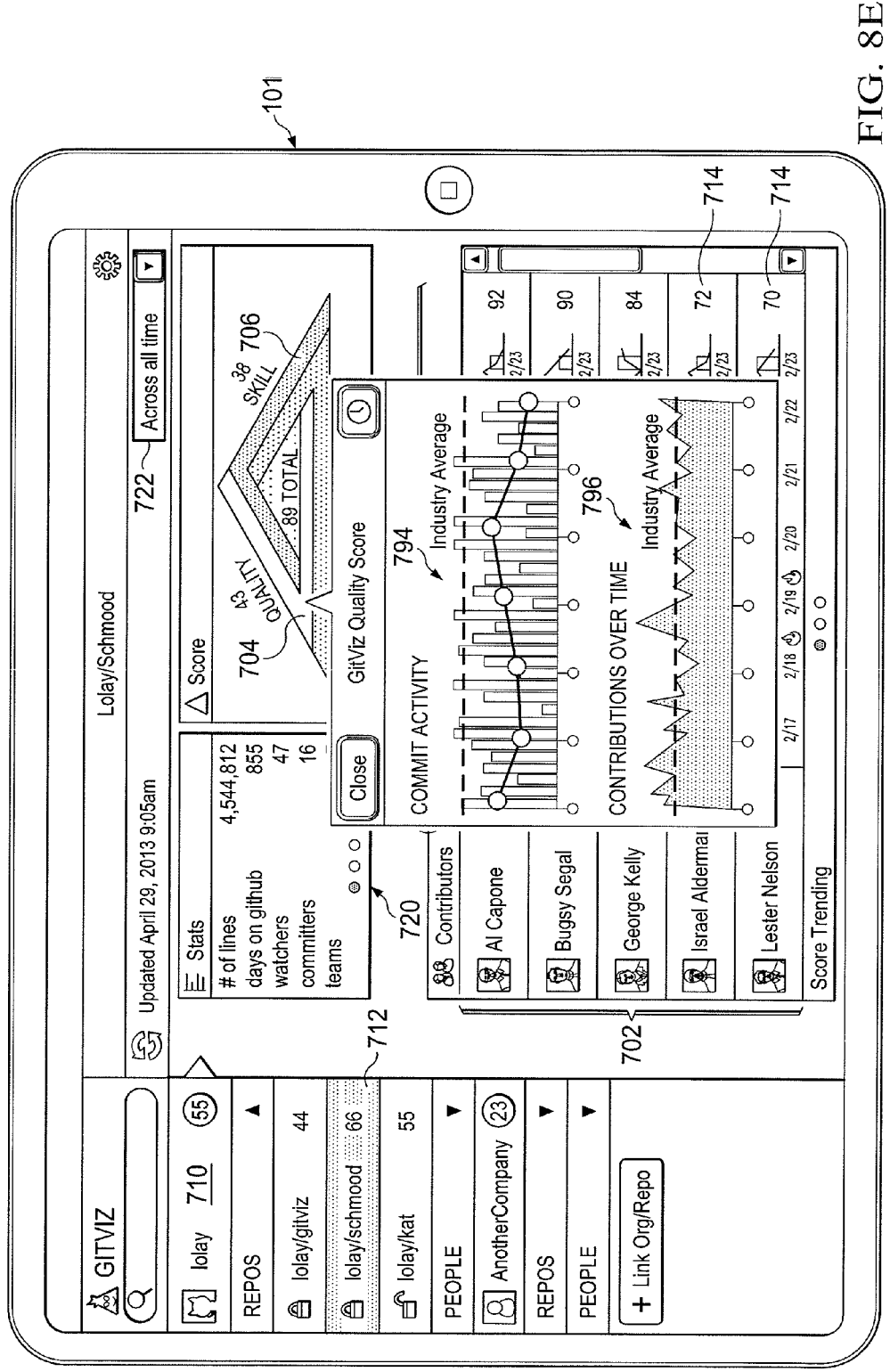

FIG. 8E shows a top level display of commit activity over time compared to an industry average at 794, as well as contributions over time compared to an industry average at 796.

Figure 8F:
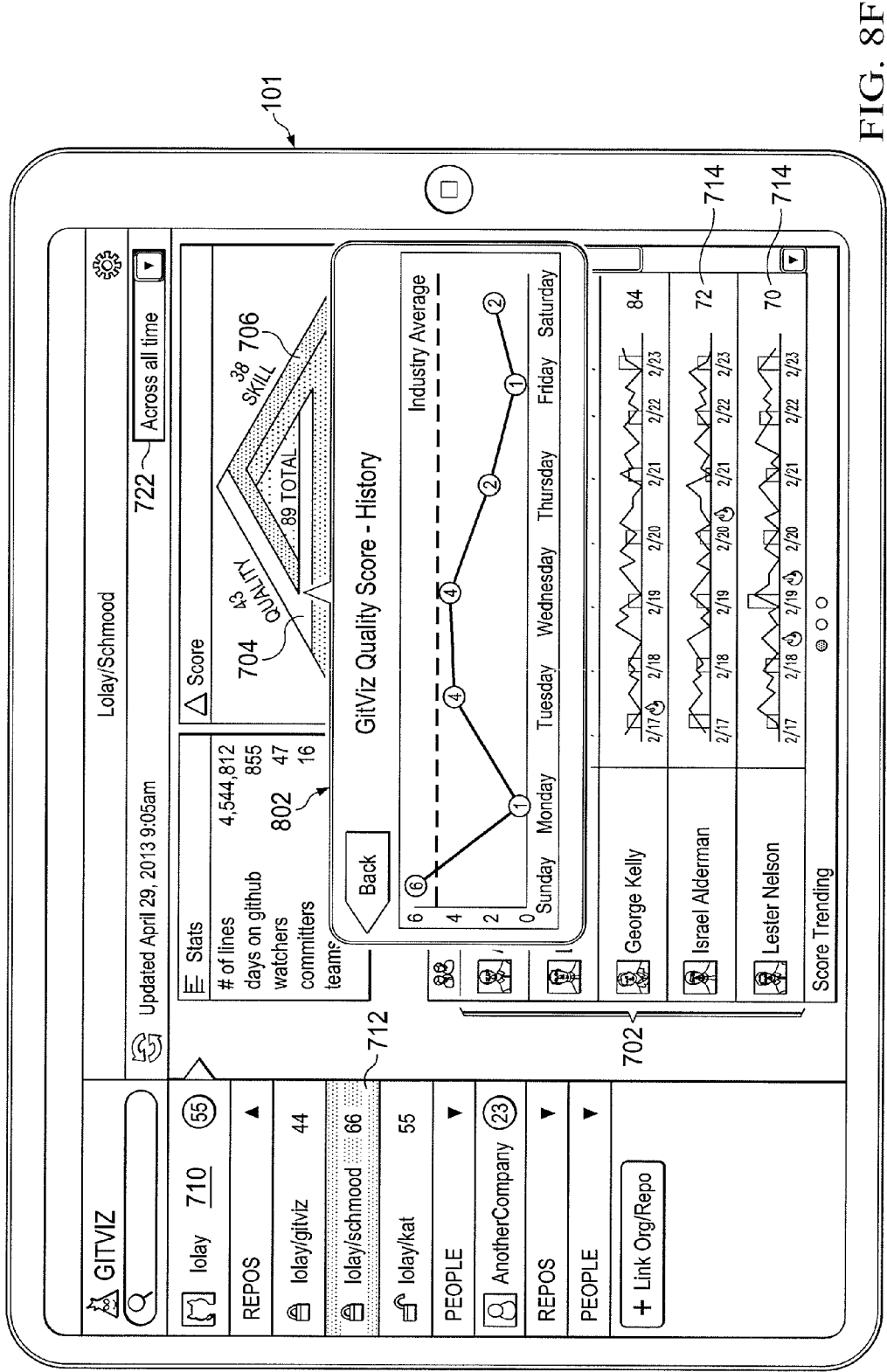

FIG. 8F depicts a screen shot including a detailed pop up window 802 illustrating a quality score history compared to an industry average over time.

Figure 8G:
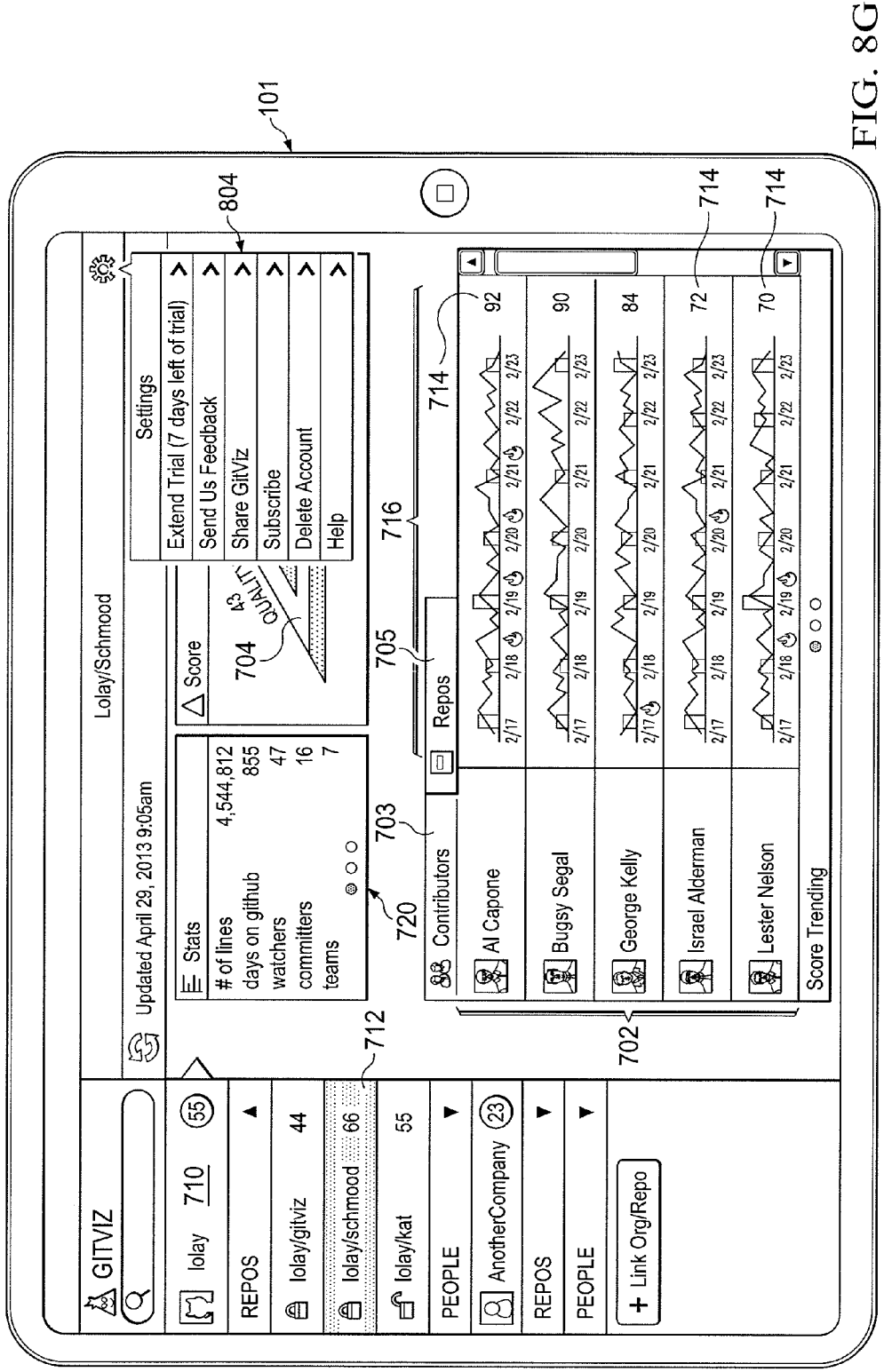

FIG. 8G shows a drop down window 804 from a settings tab.

An end-user can view summary data 112 and score data 110 for every organization, repository, user or contributor that they have access to view. Access is defined by the source control management system, which is used to determine the view access within the display 101. Source code metadata 107, programming language metadata 108 can also be viewed. Summary data 112 and score data 110 are also available in a historical view, and the end-user can browse historical data by a day, week, month or year look back. Graphical representations of the summary data 112, score data 110, source code metadata 107, programming language metadata 108 and source code history are also shown to the end user.

Figure 9:
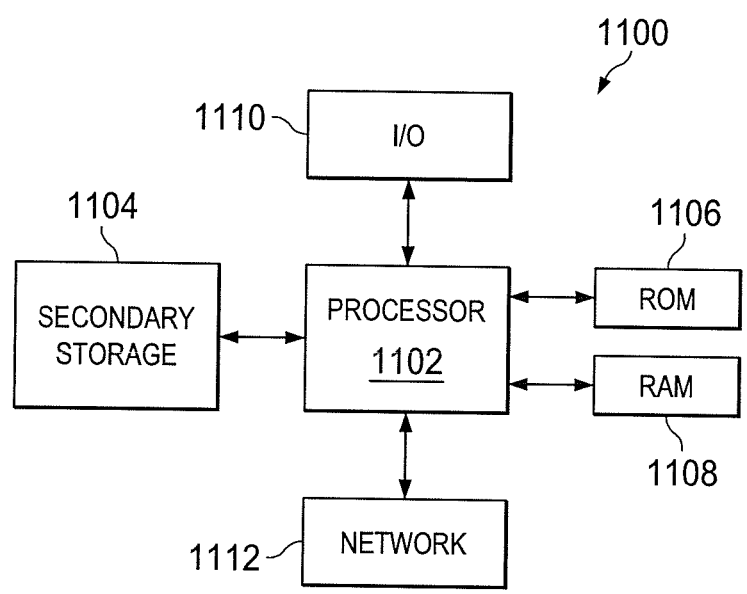
FIG. 9 illustrates a detailed diagram of a typical component according to the present disclosure.

The components described above may be implemented on any general-purpose network component, such as a computer, tablet, or network component with sufficient processing power, memory resources, and network throughput capability to handle the necessary workload placed upon it. FIG. 9 illustrates a typical, general-purpose component 1100 suitable for implementing one or more embodiments of the components disclosed herein. The component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of operating a source control management system, comprising:
   an application engine fetching data files from at least one repository, the data files comprising source code, source code metadata and programming language metadata;
   processing the data files by aggregating additions, deletions and total changes to the data files per repository, user and contributor of the data files to create summary data;
   processing each of the data files for each commit in each said repository and extracting diff hunk information;
   calculating score data comprising velocity and churn for each repository, user and contributor; and
   calculating a master score as a function of the velocity and the churn for each repository, user and contributor.

2. The method as specified in claim 1 further comprising calculating the score data to include skill for each repository, user and contributor.

3. The method as specified in claim 1 further comprising displaying the score data as a function of a selectively established time period.

4. The method as specified claim 1 further comprising displaying the score data as a function of a selectively established contributor.

5. The method as specified in claim 1 further comprising displaying the score data as a function of a predetermined set of data.

6. A method of operating a source control management system, comprising:
   an application engine fetching data files from at least one repository, the data files comprising source code, source code metadata and programming language metadata;
   processing the data files by aggregating additions, deletions and total changes to the data files per repository, user and contributor of the data files to create summary data;
   processing each of the data files for each commit in each said repository and extracting diff hunk information; and
   calculating score data comprising velocity and churn for each repository, user and contributor; and
   displaying the velocity and churn for each repository, user and contributor.

7. The method as specified in claim 6 further comprising displaying the score data in a hierarchical format for each repository, user and contributor.

8. The method as specified in claim 7 further comprising displaying historical score data for each repository, user and contributor.

9. A method of operating a source control management system, comprising:
   an application engine fetching data files from at least one repository, the data files comprising source code, source code metadata and programming language metadata;
   processing the data files by aggregating additions, deletions and total changes to the data files per repository, user and contributor of the data files to create summary data;
   processing each of the data files for each commit in each said repository and extracting diff hunk information;
   calculating score data comprising velocity and churn for each repository, user and contributor; and
   displaying the score data as a function of a selectively established repository.

10. A source control management system, comprising:
    an application engine configured to fetch data files from at least one repository, the data files comprising source code, source code metadata and programming language metadata;
    a processor configured to process the data files by aggregating additions, deletions and total changes to the data files per repository, user and contributor of the data files to create summary data;
    the processor further configured to process each of the data files for each commit in each said repository and extract diff hunk information, and calculate score data comprising velocity and churn for each repository, user and contributor; and
    wherein the processor is configured to calculate a master score as a function of the velocity and the churn for each repository, user and contributor.

11. The source control management system as specified in claim 10 wherein the processor is configured to calculate the score data to include skill for each repository, user and contributor.

12. The source control management system as specified in claim 10 wherein the processor is configured to display the score data as a function of a selectively established time period.

13. The source control management system as specified claim 10 wherein the processor is configured to display the score data as a function of a selectively established contributor.

14. The source control management system as specified claim 10 wherein the processor is configured to display the score data as a function of a predetermined set of data.

15. A source control management system, comprising:
    an application engine configured to fetch data files from at least one repository, the data files comprising source code, source code metadata and programming language metadata; and
    a processor configured to process the data files by aggregating additions, deletions and total changes to the data files per repository, user and contributor of the data files to create summary data;
    the processor further configured to process each of the data files for each commit in each said repository and extract diff hunk information, and calculate score data comprising velocity and churn for each repository, user and contributor, wherein the processor is configured to display the velocity and churn for each repository, user and contributor.

16. The source control management system as specified in claim 15 wherein the processor is configured to display the score data in a hierarchical format for each repository, user and contributor.

17. The source control management system as specified in claim 16 wherein the processor is configured to display historical score data for each repository, user and contributor.

18. A source control management system, comprising:
- an application engine configured to fetch data files from at least one repository, the data files comprising source code, source code metadata and programming language metadata;
- a processor configured to process the data files by aggregating additions, deletions and total changes to the data files per repository, user and contributor of the data files to create summary data;
- the processor further configured to process each of the data files for each commit in each said repository and extract diff hunk information, and calculate score data comprising velocity and churn for each repository, user and contributor, wherein the processor is configured to display the score data as a function of a selectively established repository.

* * * * *